United States Patent
Agiwal

(10) Patent No.: US 12,520,328 B2
(45) Date of Patent: Jan. 6, 2026

(54) SYSTEM AND METHOD OF PDCCH MONITORING IN NEXT GENERATION COMMUNICATION SYSTEM

(71) Applicant: Samsung Electronics Co., Ltd., Gyeonggi-do (KR)

(72) Inventor: Anil Agiwal, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 372 days.

(21) Appl. No.: 18/026,206

(22) PCT Filed: Jul. 21, 2022

(86) PCT No.: PCT/KR2022/010665
§ 371 (c)(1),
(2) Date: Mar. 14, 2023

(87) PCT Pub. No.: WO2023/003372
PCT Pub. Date: Jan. 26, 2023

(65) Prior Publication Data
US 2023/0371037 A1    Nov. 16, 2023

(30) Foreign Application Priority Data
Jul. 21, 2021 (KR) .................. 10-2021-0095542

(51) Int. Cl.
*H04W 72/232* (2023.01)
*H04L 5/00* (2006.01)

(52) U.S. Cl.
CPC ......... *H04W 72/232* (2023.01); *H04L 5/0048* (2013.01); *H04L 5/0096* (2013.01)

(58) Field of Classification Search
CPC .. H04W 72/232; H04W 76/28; H04L 5/0048; H04L 5/0053; H04L 5/0096
See application file for complete search history.

(56) References Cited

U.S. PATENT DOCUMENTS

| | | | |
|---|---|---|---|
| 10,624,077 B2 | 4/2020 | Agiwal et al. | |
| 11,490,384 B2 * | 11/2022 | Wu | H04W 52/0216 |
| 12,022,393 B2 * | 6/2024 | Ye | H04W 52/0232 |
| 2020/0029315 A1 * | 1/2020 | Lin | H04W 52/0216 |
| 2020/0100179 A1 | 3/2020 | Zhou et al. | |
| 2022/0312463 A1 * | 9/2022 | Niu | H04W 52/0235 |
| 2023/0025742 A1 * | 1/2023 | Agiwal | H04W 72/23 |

(Continued)

FOREIGN PATENT DOCUMENTS

WO    WO 2021/109501    6/2021

OTHER PUBLICATIONS

PCT/ISA/210 Search Report issued on PCT/KR2022/010665, Oct. 19, 2022 pp. 3.

(Continued)

*Primary Examiner* — Mounir Moutaouakil
(74) *Attorney, Agent, or Firm* — The Farrell Law Firm, P.C.

(57) ABSTRACT

A method performed by a user equipment (UE) in a wireless communication system is provided. The method includes identifying that one or more cells are configured; receiving, on a serving cell among the one or more cells, downlink control information (DCI) including information that indicates skipping PDCCH monitoring; and skipping the PDCCH monitoring for a duration on the serving cell based on the DCI.

14 Claims, 13 Drawing Sheets

(56) References Cited

U.S. PATENT DOCUMENTS

2023/0262599 A1* 8/2023 Jung .................... H04L 5/0007
370/311
2023/0300854 A1* 9/2023 Agiwal ................ H04W 72/12

OTHER PUBLICATIONS

PCT/ISA/237 Written Opinion issued on PCT/KR2022/010665, Oct. 19, 2022 pp. 4.

Ericsson, "Design of active time power savings mechanisms", 3GPP TSG RAN WG1 #105-e R1-2105794 e-Meeting, May 10-27, 2021, pp. 10.

Moderator (vivo), "FL summary#3 of DCI-based power saving adaptation", 3GPP TSG RAN WG1#105-e R1-2106243 e-Meeting, May 10-27, 2021, pp. 87.

Apple Inc., "Enhanced DCI-based power saving adaptation", 3GPP TSG-RAN WG1 Meeting #105-e R1-2105118 e-Meeting, May 10-May 27, 2021, pp. 8.

* cited by examiner

FIG. 6

| PDCCHSkipSecondaryDRXGroup | | PDCCHSkipNonSecondaryDRXGroup | |
|---|---|---|---|
| 0 | Do not skip | 0 | Do not skip |
| 1 | Skip | 1 | Skip |
| Note: PDCCHSkipSecondaryDRXGroup/PDCCHSkipNonSecondaryDRXGroup may be absent incase of no skipping ||||

SYSTEM AND METHOD OF PDCCH MONITORING IN NEXT GENERATION COMMUNICATION SYSTEM

PRIORITY

This application is a National Phase Entry of PCT International Application No. PCT/KR2022/010665, which was filed on Jul. 21, 2022, and claims priority to Korean Patent Application No. 10-2021-0095542, which was filed on Jul. 21, 2021, the entire content of each of which is incorporated herein by reference.

TECHNICAL FIELD

The disclosure relates to a wireless communication system. Specifically, the disclosure relates to an apparatus, a method and a system for PDCCH monitoring.

BACKGROUND ART

Fifth generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement sixth generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive Multiple-Input MultipleOutput (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of Bandwidth Part (BWP), new channel coding methods such as a Low Density Parity Check (LDPC) code for large amount of data transmission and a polar code for highly reliable transmission of control information, L2 preprocessing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random-access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and nextgeneration distributed computing technology for implementing services at levels of complexity exceeding the limit of UE operation capability by utilizing ultrahigh-performance communication and computing resources.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

The disclosure relates to operations of a user equipment (UE) and a base station (BS) in a wireless communication system. More particularly, the disclosure relates to method of physical downlink control channel (PDCCH) monitoring.

An aspect of the disclosure is to provide a method and apparatus for skipping PDCCH monitoring.

Another aspect of the disclosure is to provide a method and an apparatus for skipping PDCCH monitoring in case that at least one discontinuous reception (DRX) group is configured.

Additional aspects will be set forth in part in the description which follows and, in part, will be apparent from the description, or may be learned by practice of the presented embodiments.

Solution to Problem

In accordance with an aspect of the disclosure, a method performed by a user equipment (UE) in a wireless communication system is provided. The method includes identifying that one or more cells are configured; receiving, on a serving cell among the one or more cells, downlink control information (DCI) including information that indicates skipping PDCCH monitoring; and skipping the PDCCH monitoring for a duration on the serving cell based on the DCI.

In accordance with another aspect of the disclosure, a method performed by a base station in a wireless communication system is provided. The method includes identifying that one or more cells are configured to a user equipment (UE); transmitting, to the UE, downlink control information (DCI) including information that indicates skipping PDCCH monitoring, on a serving cell among the one or more cells; and skipping transmitting a PDCCH for a duration on the serving cell.

In accordance with another aspect of the disclosure, a user equipment (UE) in a wireless communication system is provided. The UE includes a transceiver configured to transmit and receive a signal; and a controller coupled with the transceiver. The controller is configured to identify that one or more cells are configured, receive, on a serving cell among the one or more cells, downlink control information (DCI) including information that indicates skipping PDCCH monitoring, and skip the PDCCH monitoring for a duration on the serving cell based on the DCI.

In accordance with another aspect of the disclosure, a base station in a wireless communication system is provided. The base station includes a transceiver configured to transmit and receive a signal, and a controller coupled with the transceiver. The controller is configured to identify that one or more cells are configured to a user equipment (UE), transmit, to the UE, downlink control information (DCI) including information that indicates skipping PDCCH monitoring, on a serving cell among the one or more cells, and skip transmitting a PDCCH for a duration on the serving cell.

Other aspects, advantages, and salient features of the disclosure will become apparent to those skilled in the art from the following detailed description, which, taken in conjunction with the annexed drawings, discloses various embodiments of the disclosure.

Advantageous Effects of Invention

According to an embodiment of the disclosure, the UE can determine a cell to which skipping of the PDCCH monitoring is applied.

According to an embodiment of the disclosure, UE can skip PDCCH monitoring to save power consumption.

BRIEF DESCRIPTION OF DRAWINGS

The above and other aspects, features, and advantages of certain embodiments of the disclosure will be more apparent from the following description taken in conjunction with the accompanying drawings, in which:

FIG. 6 illustrates another example of the PDCCH skipping indication field in DCI, according to an embodiment of the disclosure;

Throughout the drawings, it should be noted that like reference numbers are used to depict the same or similar elements, features, and structures.

MODE FOR THE INVENTION

Figure 1:
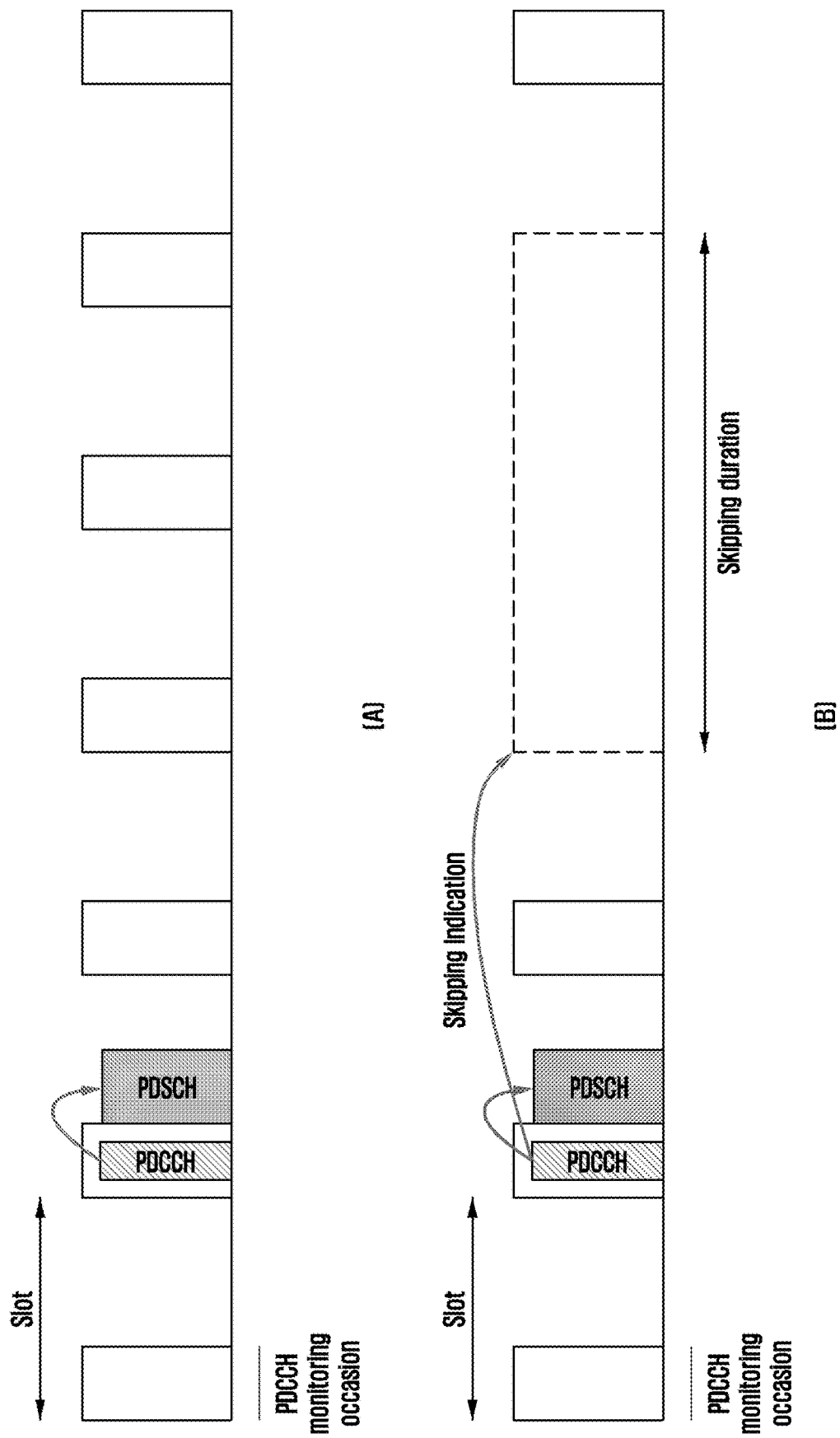
FIG. 1 illustrates an example of normal PDCCH monitoring and an example of PDCCH skipping.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before undertaking the detailed description below, it can be advantageous to set forth definitions of certain words and phrases used herein. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, connect to, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C. For example, "at least one of: A, B, or C" includes any of the following combinations: A, B, C, A and B, A and C, B and C, and A and B and C.

Moreover, various functions described below can be implemented or supported by one or more computer programs, each of which is formed from computer-readable program code and embodied in a computer-readable medium. The terms "application" and "program" refer to one or more computer programs, software components, sets of instructions, procedures, functions, objects, classes, instances, related data, or a portion thereof adapted for implementation in a suitable computer-readable program code. The phrase "computer-readable program code" includes any type of computer code, including source code, object code, and executable code. The phrase "computer-readable medium" includes any type of medium capable of being accessed by a computer, such as Read-Only Memory (ROM), Random Access Memory (RAM), a hard disk drive, a Compact Disc (CD), a Digital Video Disc (DVD), or any other type of memory. A "non-transitory" computer-readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

Terms used herein to describe the embodiments are not intended to limit and/or define the scope of the disclosure. For example, unless otherwise defined, the technical terms or scientific terms used in the disclosure shall have the ordinary meaning understood by those with ordinary skills in the art to which the disclosure belongs.

It should be understood that "first", "second" and similar words used in the disclosure do not express any order, quantity or importance, but are only used to distinguish different components. Unless otherwise indicated by the context clearly, similar words such as "a", "an" or "the" in a singular form do not express a limitation of quantity, but express an existence of at least one.

As used herein, any reference to "one example" or "example", and "one embodiment" or "embodiment" means that particular elements, features, structures or characteristics described in connection with the embodiment is included in at least one embodiment. The phrases "in one embodiment" or "in one example" appearing in different places do not necessarily refer to the same embodiment.

It will be further understood that similar words such as the term "include" or "comprise" mean that elements or objects appearing before the word encompass the listed elements or objects appearing after the word and their equivalents, but other elements or objects are not excluded. Similar words such as "connect" or "connected" are not limited to physical or mechanical connection, but can include electrical connection, whether direct or indirect. "Upper", "lower", "left" and "right" are only used to express a relative positional relationship, and when an absolute position of the described object changes, the relative positional relationship may change accordingly.

In the description of the disclosure, when it is considered that some detailed explanations about functions or configurations may unnecessarily obscure the essence of the disclosure, these detailed explanations will be omitted. All terms (including descriptive or technical terms) used herein should be interpreted as having meanings apparent to those of ordinary skill in the art. However, these terms may have different meanings according to the intention of those of ordinary skill in the art, precedents or the emergence of new technologies, and therefore, the terms used herein must be defined based on the meanings of these terms together with the description provided herein.

Hereinafter, for example, the base station may be at least one of a gNode B, an eNode B (eNB), a Node B, a radio access unit, a base station controller, and a node on a network. The terminal may include a user equipment (UE), a mobile station (MS), a mobile phone, a smart phone, a computer or multimedia system capable of performing communication functions. In some embodiments of the disclosure, the downlink (DL) is a wireless transmission path through which signals are transmitted from a base station to a terminal, and the uplink (UL) is a wireless transmission path through which signals are transmitted from a terminal to a base station.

The various embodiments discussed below for describing the principles of the disclosure herein are for illustration purposes only and should not be interpreted as limiting the scope of the disclosure in any way. Those skilled in the art will understand that the principles of the disclosure can be implemented in any suitably arranged wireless communication system. For example, although the following detailed description of the embodiments of the disclosure will be directed to 5G, those skilled in the art can understand that the main points of the disclosure can also be applied to other communication systems (for example, beyond 5G (B5G) or 6G) with similar technical backgrounds and channel formats with slight modifications without departing from the scope of the disclosure.

Hereinafter, the embodiments of the disclosure will be described in detail with reference to the accompanying drawings. It should be noted that the same reference numerals in different drawings will be used to refer to the same elements already described.

Carrier aggregation (CA)/Multi-connectivity in fifth generation wireless communication system: The fifth generation wireless communication system, supports standalone mode of operation as well dual connectivity (DC). In DC a multiple reception (Rx)/transmission (Tx) UE may be configured to utilise resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-radio access technology (RAT) Dual Connectivity (MR-DC) operation whereby a UE in RRC_CONNECTED is configured to utilise radio resources provided by two distinct schedulers, located in two different nodes connected via a non-ideal backhaul and providing either E-UTRA (i.e. if the node is an ng-eNB) or NR access (i.e. if the node is a gNB). In NR for a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the PCell and optionally one or more SCells. In NR the term Secondary Cell Group (SCG) refers to a group of serving cells associated with the Secondary Node, comprising of the PSCell and optionally one or more SCells. In NR PCell (primary cell) refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

Random access in fifth generation wireless communication system: In the 5G wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in UL by nonsynchronized UE in RRC CONNECTED state. Several types of random access procedure is supported such as contention based random access, contention free random access and each of these can be one 2 step or 4 step random access.

BWP operation in fifth generation wireless communication system: In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP i.e. it does not have to monitor PDCCH on the entire DL frequency of the serving cell. In RRC connected state, UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the fifth generation wireless communication system, RRC can be in one of the following states: RRC_IDLE, RRC_INACTIVE, and RRC_CONNECTED. A UE is either in RRC_CONNECTED state or in RRC_INACTIVE state when an RRC connection has been established. If this is not the case, i.e. no RRC connection is established, the UE is in RRC_IDLE state. The RRC states can further be characterized as follows:

In the RRC_IDLE, a UE specific discontinuous reception (DRX) may be configured by upper layers. The UE monitors Short Messages transmitted with paging RNTI (P-RNTI) over DCI; monitors a Paging channel for CN paging using 5G-S-temoprary mobile subscriber identity (5G-S-TMSI); performs neighboring cell measurements and cell (re-)selection; acquires system information and can send SI request (if configured); performs logging of available measurements together with location and time for logged measurement configured UEs.

In RRC_INACTIVE, a UE specific DRX may be configured by upper layers or by RRC layer; UE stores the UE Inactive AS context; a RAN-based notification area is configured by RRC layer. The UE monitors Short Messages transmitted with P-RNTI over DCI; monitors a Paging channel for CN paging using 5G-S-TMSI and RAN paging using fulll-RNTI; performs neighbouring cell measurements and cell (re-)selection; performs RAN-based notification area updates periodically and when moving outside the configured RAN-based notification area; acquires system information and can send SI request (if configured); performs logging of available measurements together with location and time for logged measurement configured UEs.

In the RRC_CONNECTED, the UE stores the AS context and transfer of unicast data to/from UE takes place. The UE monitors Short Messages transmitted with P-RNTI over DCI, if configured; monitors control channels associated with the shared data channel to determine if data is scheduled for it; provides channel quality and feedback information; performs neighbouring cell measurements and measurement reporting; acquires system information.

PDCCH in fifth generation wireless communication system: In the fifth generation wireless communication system, Physical Downlink Control Channel (PDCCH) is used to schedule DL transmissions on physical downlink shared channel (PDSCH) and UL transmissions on physical uplink shared channel (PUSCH), where the Downlink Control Information (DCI) on PDCCH includes: Downlink assignments containing at least modulation and coding format, resource allocation, and hybrid-ARQ information related to DL-SCH; Uplink scheduling grants containing at least modulation and coding format, resource allocation, and hybrid-ARQ information related to UL-SCH. In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the physical resource block(s) (PRB(s)) and orthogonal frequency-division multiplexing (OFDM) symbol(s) where the UE may assume no transmission is intended for the UE; Transmission of transmit power control (TPC) commands for PUCCH and PUSCH; Transmission of one or more TPC commands for sounding reference signal (SRS) transmissions by one or more UEs; Switching a UE's active bandwidth part; Initiating a random access procedure.

A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. QPSK modulation is used for PDCCH.

In fifth generation wireless communication system, a list of search space configurations is signaled by gNB for each configured BWP of serving cell wherein each search configuration is uniquely identified by a search space identifier. Search space identifier is unique amongst the BWPs of a serving cell. Identifier of search space configurtaion to be used for specific purpose such as paging reception, SI reception, random access response reception is explicitly signaled by gNB for each configured BWP. In NR search space configuration comprises of parameters Monitoring-periodicity-PDCCH-slot, Monitoring-offset-PDCCH-slot, Monitoringsymbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$(y*(\text{number of slots in a radio frame})+x-\text{Monitoring-offset-PDCCH-slot}) \bmod (\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. Search space configuration includes the identifier of coreset configuration associated with it. A list of coreset configurations are signaled by gNB for each configured BWP of serving cell wherein each coreset configuration is uniquely identified by an coreset identifier. Coreset identifier is unique amongst the BWPs of a serving cell.

Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported SCS is pre-defined in NR.

Each coreset configuration is associated with a list of Transmission configuration indicator (TCI) states. One DL reference signal (RS) ID (e.g., Synchronization Signal Block (SSB) or channel state information reference signal (CSI RS)) is configured per TCI state. The list of TCI states corresponding to a coreset configuration is signaled by gNB via RRC signaling. One of the TCI state in TCI state list is activated and indicated to UE by gNB. TCI state indicates the DL TX beam (DL TX beam is quasi co located (QCLed) with SSB/CSI RS of TCI state) used by gNB for transmission of PDCCH in the PDCCH monitoring occasions of a search space.

Meanwhile, there have been various studies on optimising PDCCH monitoring in 5G communication system recently.

FIG. 1 illustrates an example of normal PDCCH monitoring and an example of PDCCH skipping.

Specifically, FIG. 1(A) illustrates an example of normal PDCCH monitoring where UE monitors all the configured PDCCH monitoring occasions. FIG. 1(B) illustrates an example of PDCCH skipping indicated by scheduling DCI. Referring to the FIG. 1B, PDCCH skipping may be applied by UE for PDCCH monitoring in RRC_CONNECTED state. The scheduling DCI is DCI which indicates scheduled DL or UL resources. Skipping duration may be indicated by RRC message or may be indicated by DCI or may be pre-defined. Upon receiving PDCCH skipping indication, UE skips PDCCH monitoring during the skipping duration.

Figure 2:
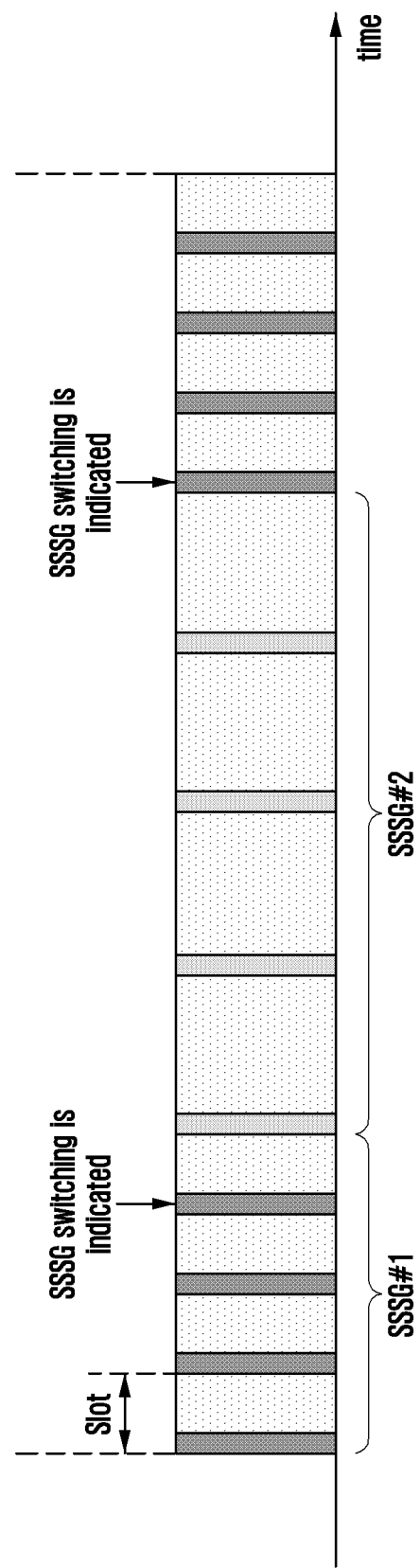
FIG. 2 illustrates an example of SSSG (search space set group) switching for PDCCH skipping, according to an embodiment of the disclosure.

FIG. 2 illustrates an example of SSSG (search space set group) switching for PDCCH skipping, according to an embodiment of the disclosure.

Referring to FIG. 2, SSSG switching for PDCCH skipping may be applied by UE for PDCCH monitoring in RRC_CONNECTED state. SSSG #2 may be an 'empty' SSSG i.e. no SS set(s) is configured for this SSSG. So, UE does not monitor PDCCH when UE switches to SSSG #2.

The above information is presented as background information only to assist with an understanding of the disclosure. No determination has been made, and no assertion is made, as to whether any of the above might be applicable as prior art with regard to the disclosure.

In 5G wireless communication system, the PDCCH monitoring activity of the UE in RRC connected mode is governed by DRX. When DRX is configured, the UE does not have to continuously monitor PDCCH. DRX is characterized by the following:

on-duration: duration that the UE waits for, after waking up, to receive PDCCHs. If the UE successfully decodes a PDCCH, the UE stays awake and starts the inactivity timer;
  inactivity-timer: duration that the UE waits to successfully decode a PDCCH, from the last successful decoding of a PDCCH, failing which it can go back to sleep.

The UE shall restart the inactivity timer following a single successful decoding of a PDCCH for a first transmission only (i.e. not for retransmissions);

retransmission-timer: duration until a retransmission can be expected;

cycle: specifies the periodic repetition of the on-duration followed by a possible period of inactivity (see FIG. 5 below);

active-time: total duration that the UE monitors PDCCH. This includes the "on-duration" of the DRX cycle, the time UE is performing continuous reception while the inactivity timer has not expired, and the time when the UE is performing continuous reception while waiting for a retransmission opportunity.

In the RRC_CONNECTED serving cells of a MAC entity may be configured by RRC in two DRX groups with separate DRX parameters. Note that MAC entity is per cell group (CG). When RRC does not configure a secondary DRX group in a CG, there is only one DRX group in that CG and all Serving Cells of that belong to that one DRX group. When two DRX groups are configured in a CG, each Serving Cell of CG is uniquely assigned to either of the two groups. DRX Parameters are categorised into group specific parameters and common parameters. The group specific parameters consist of drx-onDurationTimer and drx-InactivityTimer. The common parameters consist of drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

One of the issue is PDCCH skipping indication handling when multiple DRX groups are configured. In general, on which serving cell(s) UE skips PDCCH monitoring upon receiving PDCCH skipping indication? Hereinafter, when skipping of PDCCH monitoring is indicated, methods for skipping PDCCH monitoring will be described.

Method 1

Figure 3:
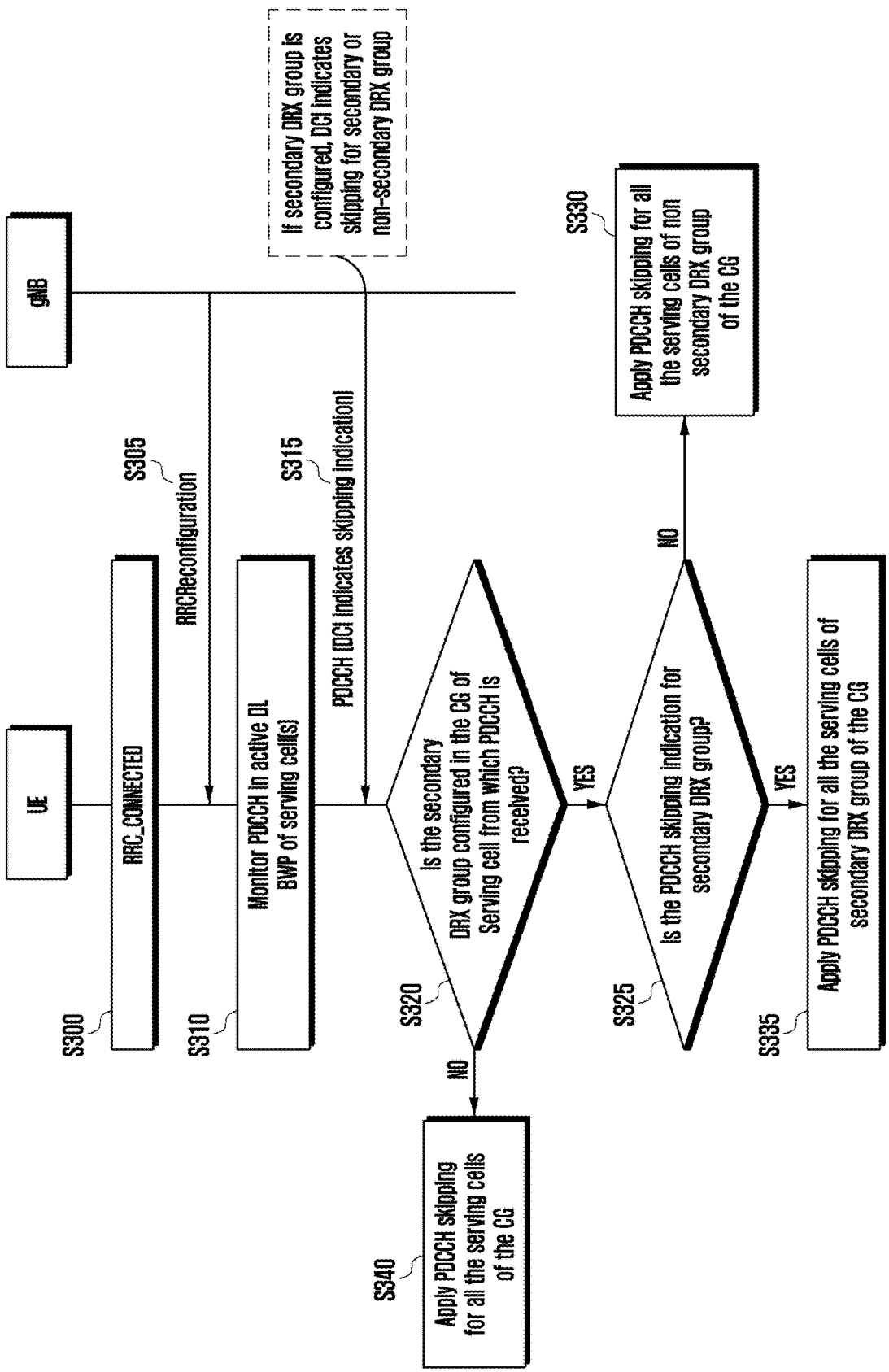
FIG. 3 illustrates an example of signalling flows between UE and gNB, in case that the DCI indicates skipping PDCCH monitoring for either secondary DRX group or non-secondary DRX group, according to an embodiment of the disclosure.

FIG. 3 illustrates an example of signalling flows between UE and gNB, in case that the DCI indicates skipping PDCCH monitoring for either secondary DRX group or non-secondary DRX group, according to an embodiment of the disclosure.

FIG. 3 is only an example to explain the disclosure, but does not limit the technical scope of the disclosure. At least one step of FIG. 3 may be omitted in some cases, or two or more steps may be merged and performed as one step. Also, the order of operation steps of FIG. 3 may be changed.

UE may be in RRC_CONNECTED state (S300).

UE may receive RRCReconfiguration message from gNB (S305). The RRCReconfiguration message may include secondaryDRX-GroupConfig in configuration of zero or more secondary cells of master cell group, and/or the RRCReconfiguration message may include secondaryDRX-GroupConfig in configuration of zero or more secondary cells of secondary cell group. One or more configured serving cells (other than SpCell) may be activated via RRC signalling or MAC CE, UE may monitor PDCCH in the active DL BWP of SpCell and active DL BWP(s) of activated Secondary cell(s) (S310). The PDCCH may be monitored in PDCCH monitoring occasions configured by one or more search space configurations of active DL BWP.

UE may receive PDCCH from gNB (S315). The DCI in the PDCCH may include/indicate PDCCH skipping. In an embodiment, in the RRC_CONNECTED state, UE may indicate to gNB using a dedicated RRC message (e.g. UE capability information message) whether the UE supports PDCCH skipping. UE may send the dedicated RRC message indicating whether UE supports PDCCH skipping upon request from gNB. UE may indicate to gNB whether the UE supports PDCCH skipping in Msg3 or MsgB transmitted to gNB during connection setup or connection resume. If gNB has received indication from UE that it supports PDCCH skipping, gNB may send PDCCH skipping indication.

UE may identify whether the secondary DRX group is configured in the CG of serving cell/gNB from which the PDCCH is received (S320).

If the secondary DRX group is configured for the CG, UE may identify whether the PDCCH skipping indication is for the secondary DRX group (S325).

If the secondary DRX group is configured for the CG and a PDCCH indicating PDCCH skipping for the secondary DRX group is received from serving cell/gNB (of that CG), UE and gNB may perform the following operation:

UE and gNB may apply PDCCH skipping for all the serving cells of the secondary DRX group of the CG (S335). Specifically, the UE may skip PDCCH monitoring in the skipping duration for all the serving cells of the secondary DRX group of the CG. The gNB may skip PDCCH transmission for the UE in the skipping duration for all the serving cells of the secondary DRX group of the CG. The skipping duration may be common for all the serving cells or it may be specific to each serving cell. The skipping duration(s) may be signalled using RRC signalling and/or may be signalled in DCI indicating PDCCH skipping. For example, a list of one or more skipping durations may be signalled in RRC signalling message and one of the skipping duration to be applied from the list may be signalled in DCI indicating PDCCH skipping.

In an embodiment, in the skipping duration, UE may skip PDCCH monitoring (and gNB may skip PDCCH transmission for the UE) addressed to $1^{st}$ set of RNTIs and may continue monitoring PDCCH (and gNB may transmit PDCCH for the UE) addressed to $2^{nd}$ set of RNTIs.

The $1^{st}$ and $2^{nd}$ set of RNTIs may be pre-defined.

In an embodiment, $2^{nd}$ set of RNTIs may include RNTIs (e.g. random access RNTI (RA-RNTI), paging RNTI (P-RNTI), system information RNTI (SI-RNTI), sidelink RNTI (SL-RNTI)) other than RNTIs including cell RNTI (C-RNTI), cancellation indication RNTI (CI-RNTI), configured scheduling RNTI (CS-RNTI), interruption RNTI (INT-RNTI), slot format indication RNTI (SFI-RNTI), semi-persistent CSI RNTI (SP-CSI-RNTI), transmit power control-PUCCH RNTI (TPC-PUCCH-RNTI), TPC-PUSCH-RNTI, TPC-SRS-RNTI, and availability indication RNTI (AI-RNTI). $1^{st}$ set of RNTIs may include C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI.

In an embodiment, $1^{st}$ set of RNTIs may include all the RNTIs which UE monitors in RRC_CONNECTED.

In an embodiment, $1^{st}$ set of RNTIs may include all the RNTIs which UE monitors in RRC_CONNECTED except RNTIs related to sidelink (SL) communication.

In an embodiment, in the skipping duration, UE may skip PDCCH monitoring (and gNB may skip PDCCH transmission for the UE) in the PDCCH monitoring occasions configured by UE specific search space configurations. In an embodiment, in the skipping duration, UE may skip PDCCH monitoring (and gNB may skip PDCCH transmission for the UE) in the PDCCH monitoring occasions configured by UE common search space configurations. In an embodiment, in the skipping duration, whether UE skips PDCCH monitoring (and gNB skips PDCCH transmission for the UE) in the PDCCH monitoring occasions configured by UE common search space configurations may be signalled by gNB in RRC signalling or DCI or MAC CE. In an embodiment, in the skipping duration, whether UE skips PDCCH monitoring (and gNB skips PDCCH transmission for the UE) in the PDCCH monitoring occasions configured by UE specific search space configurations may be signalled by gNB in RRC signalling or DCI or MAC CE.

If the secondary DRX group is configured for a CG and a PDCCH indicating PDCCH skipping for the non secondary DRX group (i.e. DRX group other than the secondary DRX group) is received from a serving cell (of that CG), UE and gNB may perform the following operation:

UE and gNB may apply PDCCH skipping for all the serving cells of the non secondary DRX group of the CG (S330). Specifically, the UE may skip PDCCH monitoring (and gNB may skip PDCCH transmission for the UE) in the skipping duration for all the serving cells of the non-secondary DRX group of the CG. The skipping duration may be common for all the serving cells or it may be specific to each serving cell. The skipping duration(s) may be signalled using RRC signalling and/or may be signalled in DCI indicating PDCCH skipping. For example, a list of one or more skipping durations may be signalled in RRC signalling message and one of the skipping duration to be applied from the list may be signalled in DCI indicating PDCCH skipping.

In an embodiment, in the skipping duration, UE may skip PDCCH monitoring (and gNB may skip PDCCH transmission for the UE) addressed to $1^{st}$ set of RNTIs and may continue monitoring PDCCH (and gNB may transmit PDCCH for the UE) addressed to $2^{nd}$ set of RNTIs.
  The $1^{st}$ and $2^{nd}$ set of RNTIs may be pre-defined.
  In an embodiment, $2^{nd}$ set of RNTIs may include RNTIs (e.g. RA-RNTI, P-RNTI, SI-RNTI, SL-RNTI) other than RNTIs including C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI. $1^{st}$ set of RNTIs may include C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI.
  In an embodiment, $1^{st}$ set of RNTIs may include all the RNTIs which UE monitors in RRC_CONNECTED.
  In an embodiment, $1^{st}$ set of RNTIs may include all the RNTIs which UE monitors in RRC_CONNECTED except RNTIs related to SL communication.
  In an embodiment, in the skipping duration, UE may skip PDCCH monitoring (and gNB may skip PDCCH transmission for the UE) in the PDCCH monitoring occasions configured by UE specific search space configurations. In an embodiment, in the skipping duration, UE may skip PDCCH monitoring (and gNB may skip PDCCH transmission for the UE) in the PDCCH monitoring occasions configured by UE common search space configurations. In an embodiment, in the skipping duration, whether UE skips PDCCH monitoring (and gNB skips PDCCH transmission for the UE) in the PDCCH monitoring occasions configured by UE common search space configurations may be signalled by gNB in RRC signalling or DCI or MAC CE. In an embodiment, in the skipping duration, whether UE skips PDCCH monitoring (and gNB skips PDCCH transmission for the UE) in the PDCCH monitoring occasions configured by UE specific search space configurations may be signalled by gNB in RRC signalling or DCI or MAC CE.

If the secondary DRX group is not configured for a CG and a PDCCH indicating PDCCH skipping is received from a serving cell (of that CG), UE and gNB may perform the following operation:

UE and gNB may apply PDCCH skipping for all the serving cells of the CG (S340). The UE may skip PDCCH monitoring (and gNB may skip PDCCH transmission for the UE) in the skipping duration for all the serving cells of the CG. The skipping duration may be common for all the serving cells or it may be specific to each serving cell. The skipping duration(s) may be signalled using RRC signalling and/or may be signalled in DCI indicating PDCCH skipping. For example, a list of one or more skipping durations may be signalled in RRC signalling message and one of the skipping duration to be applied from the list may be signalled in DCI indicating PDCCH skipping.

In an embodiment, in the skipping duration, UE may skip PDCCH monitoring (and gNB may skip PDCCH transmission for the UE) addressed to $1^{st}$ set of RNTIs and may continue monitoring PDCCH (and gNB may transmit PDCCH for the UE) addressed to $2^{nd}$ set of RNTIs.
  The $1^{st}$ and $2^{nd}$ set of RNTIs may be pre-defined.
  In an embodiment, $2^{nd}$ set of RNTIs may include RNTIs (e.g. RA-RNTI, P-RNTI, SI-RNTI, SL-RNTI) other than RNTIs including C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI. $1^{st}$ set of RNTIs may include C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI.
  In an embodiment, $1^{st}$ set of RNTIs may include all the RNTIs which UE monitors in RRC_CONNECTED.
  In an embodiment, $1^{st}$ set of RNTIs may include all the RNTIs which UE monitors in RRC_CONNECTED except RNTIs related to SL communication.
  In an embodiment, in the skipping duration, UE may skip PDCCH monitoring (and gNB may skip PDCCH transmission for the UE) in the PDCCH monitoring occasions configured by UE specific search space configurations. In an embodiment, in the skipping duration, UE may skip PDCCH monitoring (and gNB may skip PDCCH transmission for the UE) in the PDCCH monitoring occasions configured by UE common search space configurations. In an embodiment, in the skipping duration, whether UE skips PDCCH monitoring (and gNB skips PDCCH transmission for the UE) in the PDCCH monitoring occasions configured by UE common search space configurations may be signalled by gNB in RRC signalling or DCI or MAC CE. In an embodiment, in the skipping duration, whether UE skips PDCCH monitoring (and gNB skips PDCCH transmission for the UE) in the PDCCH monitoring occasions configured by UE specific search space configurations may be signalled by gNB in RRC signalling or DCI or MAC CE.

Figure 4:
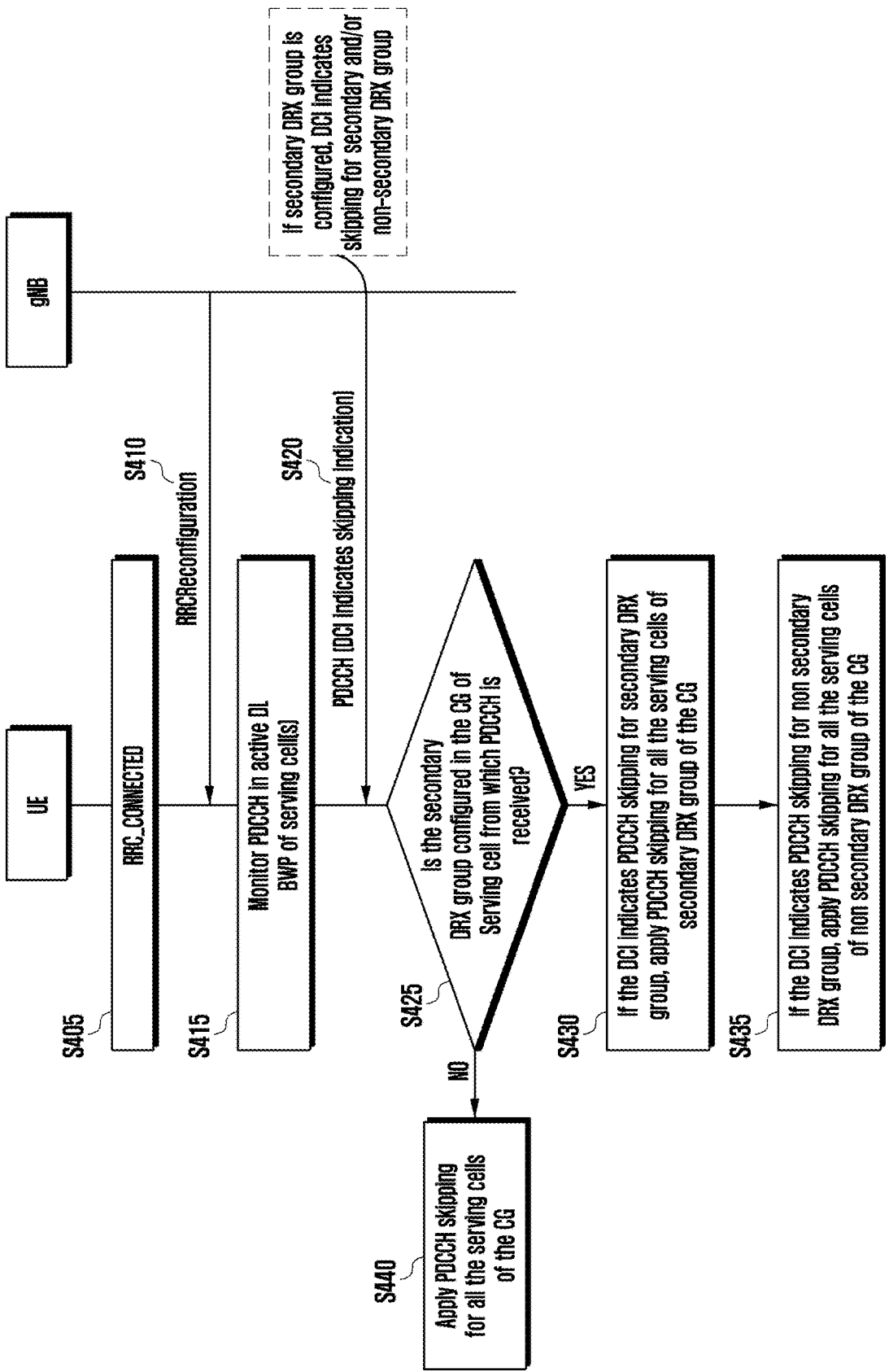
FIG. 4 illustrates an example of signalling flows between UE and gNB, in case that the DCI indicates skipping PDCCH monitoring for either secondary DRX group or non-secondary DRX group or both DRX groups, according to an embodiment of the disclosure.

FIG. 4 illustrates an example of signalling flows between UE and gNB, in case that the DCI indicates skipping PDCCH monitoring for either secondary DRX group or non-secondary DRX group or both DRX groups, according to an embodiment of the disclosure.

FIG. 4 is only an example to explain the disclosure, but does not limit the technical scope of the disclosure. At least one step of FIG. 4 may be omitted in some cases, or two or more steps may be merged and performed as one step. Also, the order of operation steps of FIG. 4 may be changed.

UE may be in RRC_CONNECTED state (S405).

UE may receive RRCReconfiguration message from gNB (S410). The RRCReconfiguration message may include secondaryDRX-GroupConfig in configuration of zero or more secondary cells of master cell group, and/or the RRCReconfiguration message may include secondaryDRX-GroupConfig in configuration of zero or more secondary cells of secondary cell group. One or more configured serving cells (other than SpCell) may be activated via RRC signalling or MAC CE.

UE may monitor PDCCH in the active DL BWP of SpCell and active DL BWP(s) of activated Secondary cell(s) (S415). The PDCCH may be monitored in PDCCH monitoring occasions configured by one or more search space configurations of active DL BWP.

UE may receive PDCCH from a serving cell (S420). The DCI in the PDCCH may include/indicate PDCCH skipping. In an embodiment, in the RRC_CONNECTED state, UE may indicate to gNB using a dedicated RRC message (e.g. UE capability information message) whether the UE supports PDCCH skipping. UE may send the dedicated RRC message indicating whether UE supports PDCCH skipping upon request from gNB. UE may indicate to gNB whether the UE supports PDCCH skipping in Msg3 or MsgB transmitted to gNB during connection setup or connection resume. If gNB has received indication from UE that it supports PDCCH skipping, gNB may send PDCCH skipping indication.

UE may identify whether the secondary DRX group is configured in the CG of a serving cell from which the PDCCH is received (S425).

In case that the secondary DRX group is configured for the CG, if DCI indicates PDCCH skipping for the secondary DRX group, UE may apply PDCCH skipping for all the serving cells of the secondary DRX group of the CG (S430). Specifically, the UE may skip PDCCH monitoring in the skipping duration for all the serving cells of the secondary DRX group of the CG. The gNB may skip PDCCH transmission for the UE in the skipping duration for all the serving cells of the secondary DRX group of the CG. The skipping duration may be common for all the serving cells or it may be specific to each serving cell. The skipping duration(s) may be signalled using RRC signalling and/or may be signalled in DCI indicating PDCCH skipping. For example, a list of one or more skipping durations may be signalled in RRC signalling message and one of the skipping duration to be applied from the list may be signalled in DCI indicating PDCCH skipping.

In case that the secondary DRX group is configured for the CG, if DCI indicates PDCCH skipping for non-secondary DRX group, UE may apply PDCCH skipping for all the serving cells of the non-secondary DRX group of the CG (S435). Specifically, the UE may skip PDCCH monitoring in the skipping duration for all the serving cells of the non-secondary DRX group of the CG. The gNB may skip PDCCH transmission for the UE in the skipping duration for all the serving cells of the non-secondary DRX group of the CG. The skipping duration may be common for all the serving cells or it may be specific to each serving cell. The skipping duration(s) may be signalled using RRC signalling and/or may be signalled in DCI indicating PDCCH skipping. For example, a list of one or more skipping durations may be signalled in RRC signalling message and one of the skipping duration to be applied from the list may be signalled in DCI indicating PDCCH skipping.

If the secondary DRX group is not configured in the CG of a serving cell from which the PDCCH is received, UE may apply PDCCH skipping for all the serving cells of the CG (S440). The UE may skip PDCCH monitoring (and gNB may skip PDCCH transmission for the UE) in the skipping duration for all the serving cells of the CG. The skipping duration may be common for all the serving cells or it may be specific to each serving cell. The skipping duration(s) may be signalled using RRC signalling and/or may be signalled in DCI indicating PDCCH skipping. For example, a list of one or more skipping durations may be signalled in RRC signalling message and one of the skipping duration to be applied from the list may be signalled in DCI indicating PDCCH skipping.

In an embodiment, in the skipping duration, UE may skip PDCCH monitoring (and gNB may skip PDCCH transmission for the UE) addressed to $1^{st}$ set of RNTIs and may continue monitoring PDCCH (and gNB may transmit PDCCH for the UE) addressed to $2^{nd}$ set of RNTIs.

The $1^{st}$ and $2^{nd}$ set of RNTIs may be pre-defined.

In an embodiment, $2^{nd}$ set of RNTIs may include RNTIs (e.g. RA-RNTI, P-RNTI, SI-RNTI, SL-RNTI) other than RNTIs including C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI. $1^{st}$ set of RNTIs may include C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI.

In an embodiment, $1^{st}$ set of RNTIs may include all the RNTIs which UE monitors in RRC_CONNECTED.

In an embodiment, $1^{st}$ set of RNTIs may include all the RNTIs which UE monitors in RRC_CONNECTED except RNTIs related to sidelink (SL) communication.

In an embodiment, in the skipping duration, UE may skip PDCCH monitoring (and gNB may skip PDCCH transmission for the UE) in the PDCCH monitoring occasions configured by UE specific search space configurations. In an embodiment, in the skipping duration, UE may skip PDCCH monitoring (and gNB may skip PDCCH transmission for the UE) in the PDCCH monitoring occasions configured by UE common search space configurations. In an embodiment, in the skipping duration, whether UE skips PDCCH monitoring (and gNB skips PDCCH transmission for the UE) in the PDCCH monitoring occasions configured by UE common search space configurations may be signalled by gNB in RRC signalling or DCI or MAC CE. In an embodiment, in the skipping duration, whether UE skips PDCCH monitoring (and gNB skips PDCCH transmission for the UE) in the PDCCH monitoring occasions configured by UE specific search space configurations may be signalled by gNB in RRC signalling or DCI or MAC CE.

Figure 5:
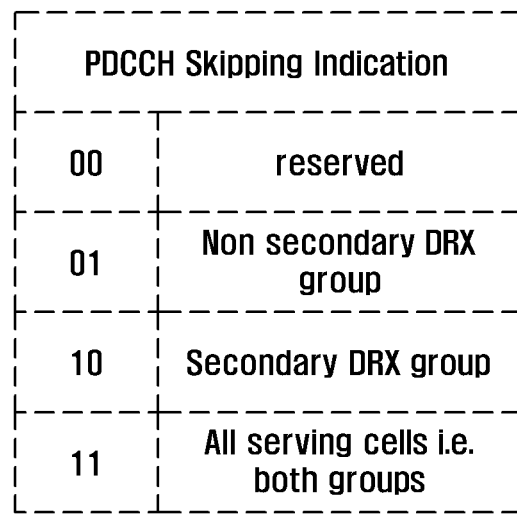
FIG. 5 illustrates an example of a PDCCH skipping indication field in DCI, according to an embodiment of the disclosure.

FIG. 5 illustrates an example of a PDCCH skipping indication field in DCI, according to an embodiment of the disclosure.

Referring to FIG. 5, the PDCCH skipping indication in DCI may be 2 bits. Note that 'PDCCH skipping for Secondary DRX group', "PDCCH skipping for non-secondary DRX group', "PDCCH skipping for both DRX groups' may be indicated using a different code point/value of 2 bits i.e. '00', '01', '10' and '11'. For example, if a value of the PDCCH skipping indication in DCI is set to "10", UE may skip PDCCH monitoring for serving cell(s) of the secondary DRX group in the skipping duration; if a value of the PDCCH skipping indication in DCI is set to "01", UE may skip PDCCH monitoring for serving cell(s) of the non secondary DRX group in the skipping duration; if a value of the PDCCH skipping indication in DCI is set to "11", UE may skip PDCCH monitoring for serving cell(s) of the both non secondary DRX group and secondary DRX group in the skipping duration.

FIG. 6 illustrates another example of the PDCCH skipping indication field in DCI, according to an embodiment of the disclosure.

Referring to FIG. 6, DCI may include separate PDCCH skipping indication for secondary DRX group and non-secondary DRX group, respectively. For example, DCI may include a first information bit (e.g. PDCCHSkipSecondaryDRXGroup) indicating whether to skip the PDCCH monitoring for secondary DRX group and a second information bit (e.g. PDCCHSkipNonSecondaryDRXGroup) indicating whether to skip the PDCCH monitoring for non-secondary DRX group.

In an embodiment, the above operation may also be applied in case PDCCH skipping indication is signalled using RRC signalling message or MAC CE instead of DCI by replacing PDCCH skipping indication in DCI with RRC signalling message or MAC CE in operation described in various embodiment of this method. In an embodiment, in the above description, PDCCH indicating UE to switch to an empty SSSG (i.e. SSSG not configured with any search space sets) or default SSSG may be also considered as PDCCH skipping indication. Skipping duration may be defined by a timer in this case or skipping duration may be the time duration until UE receives PDCCH indicating UE to switch to a non-empty SSSG or non-default SSSG.

In an embodiment, UE may receive a PDCCH skipping indication from the gNB in RRC_INACTIVE and/or RRC_IDLE. For example, UE may receive the PDCCH skipping indication during the small data transmission procedure in RRC_INACTIVE. In this case, UE may apply the PDCCH skipping for the camped cell. The UE may skip PDCCH monitoring (and gNB skips PDCCH transmission for the UE) in the skipping duration. The skipping duration may be signaled in system information or in RRC Release message. The PDCCH skipping indication may be indicated in a wakeup signal or an early paging indication or in RAR or MsgB in RRC_INACTIVE and/or RRC_IDLE. In an embodiment, for small data transmission procedure in RRC_INACTIVE or in RRC_IDLE state, if RA is initiated for SDT, PDCCH skipping indication may be sent by gNB in between Msg4 (including contention resolution identity MAC CE) transmission or MsgB including contention resolution identity transmission and RRC Release message transmission. In an embodiment, for small data transmission procedure in RRC_INACTIVE state or in RRC_IDLE state, if RA is initiated for SDT, PDCCH skipping indication may be sent by gNB after the successful completion of random access procedure.

Figure 7:
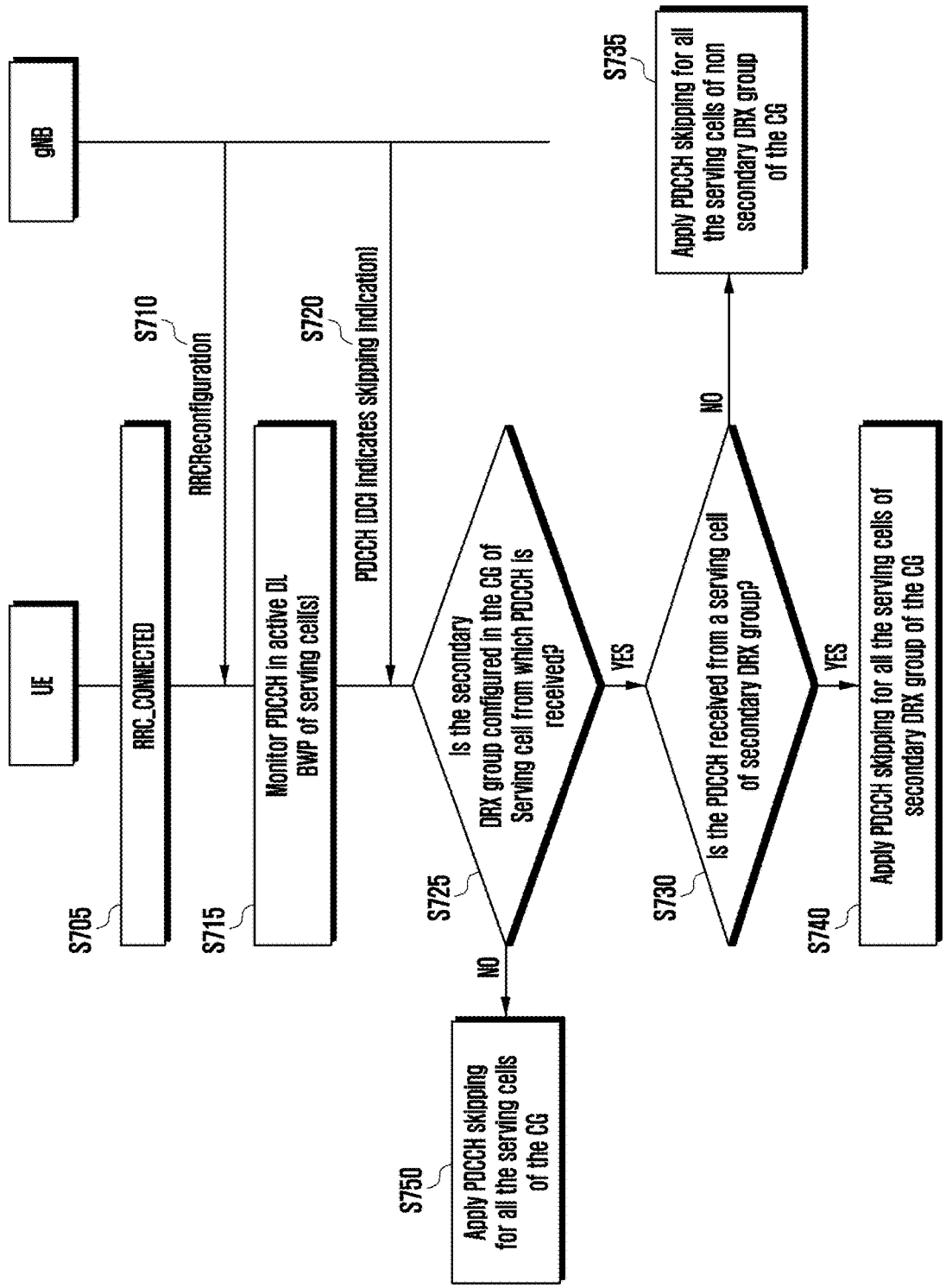
FIG. 7 illustrates an example of signalling flows between UE and gNB for skipping PDCCH monitoring based on which serving cell the PDCCH is received, according to an embodiment of the disclosure.

Method 2:
FIG. 7 illustrates an example of signalling flows between UE and gNB for skipping PDCCH monitoring based on which serving cell the PDCCH is received, according to an embodiment of the disclosure.

FIG. 7 is only an example to explain the disclosure, but does not limit the technical scope of the disclosure. At least one step of FIG. 7 may be omitted in some cases, or two or more steps may be merged and performed as one step. Also, the order of operation steps of FIG. 7 may be changed.

UE may be in RRC_CONNECTED state (S705).

UE may receive RRCReconfiguration message from gNB (S710). The RRCReconfiguration message may include secondaryDRX-GroupConfig in configuration of zero or more secondary cells of master cell group, and/or the RRCReconfiguration message may include secondaryDRX-GroupConfig in configuration of zero or more secondary cells of secondary cell group. One or more configured serving cells (other than SpCell) may be activated via RRC signalling or MAC CE.

UE may monitor PDCCH in the active DL BWP of SpCell and active DL BWP(s) of activated Secondary cell(s) (S715). The PDCCH may be monitored in PDCC monitoring occasions configured by one or more search space configurations of active DL BWP.

UE may receive PDCCH from gNB (S720). The DCI in the PDCCH may include/indicate PDCCH skipping. In an embodiment, in the RRC_CONNECTED state, UE may indicate to gNB using a dedicated RRC message (e.g. UE capability information message) whether the UE supports PDCCH skipping. UE may send the dedicated RRC message indicating whether UE supports PDCCH skipping upon request from gNB. UE may indicate to gNB whether the UE supports PDCCH skipping in Msg3 or MsgB transmitted to gNB during connection setup or connection resume. If gNB has received indication from UE that it supports PDCCH skipping, gNB may send PDCCH skipping indication in DCI.

UE may identify whether the secondary DRX group is configured in the CG of a serving cell from which the PDCCH is received (S725).

If the secondary DRX group is configured for a CG, UE may identify whether the PDCCH is received from a serving cell of the secondary DRX group (S730).

If the secondary DRX group is configured for a CG and a PDCCH indicating PDCCH skipping is received from a serving cell of the secondary DRX group of the CG, UE and gNB may perform the following operation:

UE and gNB may apply PDCCH skipping for all the serving cells of the secondary DRX group of the CG (S740). Specifically, the UE may skip PDCCH monitoring (and gNB may skip PDCCH transmission for the UE) in the skipping duration for all the serving cells of the secondary DRX group of the CG. The skipping duration may be common for all the serving cells or it may be specific to each serving cell. The skipping duration(s) may be signalled using RRC signalling and/or may be signalled in DCI indicating PDCCH skipping. For example, a list of one or more skipping durations may be signalled in RRC signalling message and one of the skipping duration to be applied from the list may be signalled in DCI indicating PDCCH skipping.

In an embodiment, in the skipping duration, UE may skip
    PDCCH monitoring (and gNB may skip PDCCH transmission for the UE) addressed to $1^{st}$ set of RNTIs and may continue monitoring PDCCH (and gNB may transmit PDCCH for the UE) addressed to $2^{nd}$ set of RNTIs.

The $1^{st}$ and $2^{nd}$ set of RNTIs may be pre-defined.

In an embodiment, $2^{nd}$ set of RNTIs may include RNTIs (e.g. RA-RNTI, P-RNTI, SI-RNTI, SL-RNTI) other than RNTIs including C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI. $1^{st}$ set of RNTIs may include C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI.

In an embodiment, $1^{st}$ set of RNTIs may include all the RNTIs which UE monitors in RRC_CONNECTED.

In an embodiment, $1^{st}$ set of RNTIs may include all the RNTIs which UE monitors in RRC_CONNECTED except RNTIs related to SL communication.

In an embodiment, in the skipping duration, UE may skip PDCCH monitoring (and gNB may skip PDCCH transmission for the UE) in the PDCCH monitoring occasions configured by UE specific search space configurations. In an embodiment, in the skipping duration, UE may skip PDCCH monitoring (and gNB may skip PDCCH transmission for the UE) in the PDCCH monitoring occasions configured by UE common search space configurations. In an embodiment, in the skipping duration, whether UE skips PDCCH monitoring (and gNB skips PDCCH transmission for the UE) in the PDCCH monitoring occasions configured by UE common search space configurations may be signalled by gNB in RRC signalling or DCI or MAC CE. In an embodiment, in the skipping duration, whether UE skips PDCCH monitoring (and gNB skips PDCCH transmission for the UE) in the PDCCH monitoring occasions configured by UE specific search space configurations may be signalled by gNB in RRC signalling or DCI or MAC CE.

If the secondary DRX group is configured for a CG and a PDCCH indicating PDCCH skipping is received from a serving cell of the non-secondary DRX group (i.e. DRX group other than the secondary DRX group) of the CG, UE and gNB may perform the following operation:

UE and gNB may apply PDCCH skipping for all the serving cells of the non-secondary DRX group of the CG (S735). The UE may skip PDCCH monitoring (and gNB may skip PDCCH transmission for the UE) in the skipping duration for all the serving cells of the non-secondary DRX group of the CG. The skipping duration may be common for all the serving cells or it may be specific to each serving cell. The skipping duration(s) may be signalled using RRC signalling and/or may be signalled in DCI indicating PDCCH skipping. For example, a list of one or more skipping durations may be signalled in RRC signalling message and one of the skipping duration to be applied from the list may be signalled in DCI indicating PDCCH skipping.

In an embodiment, in the skipping duration, UE may skip PDCCH monitoring (and gNB may skip PDCCH transmission for the UE) addressed to $1^{st}$ set of RNTIs and may continue monitoring PDCCH (and gNB may transmit PDCCH for the UE) addressed to $2^{nd}$ set of RNTIs.

The $1^{st}$ and $2^{nd}$ set of RNTIs may be pre-defined.

In an embodiment, $2^{nd}$ set of RNTIs may include RNTIs (e.g. RA-RNTI, P-RNTI, SI-RNTI, SL-RNTI) other than RNTIs including C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI. $1^{st}$ set of RNTIs may include C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI.

In an embodiment, $1^{st}$ set of RNTIs may include all the RNTIs which UE monitors in RRC_CONNECTED.

In an embodiment, $1^{st}$ set of RNTIs may include all the RNTIs which UE monitors in RRC_CONNECTED except RNTIs related to SL communication.

In an embodiment, in the skipping duration, UE may skip PDCCH monitoring (and gNB may skip PDCCH transmission for the UE) in the PDCCH monitoring occasions configured by UE specific search space configurations. In an embodiment, in the skipping duration, UE may skip PDCCH monitoring (and gNB may skip PDCCH transmission for the UE) in the PDCCH monitoring occasions configured by UE common search space configurations. In an embodiment, in the skipping duration, whether UE skips PDCCH monitoring (and gNB skips PDCCH transmission for the UE) in the PDCCH monitoring occasions configured by UE common search space configurations may be signalled by gNB in RRC signalling or DCI or MAC CE. In an embodiment, in the skipping duration, whether UE skips PDCCH monitoring (and gNB skips PDCCH transmission for the UE) in the PDCCH monitoring occasions configured by UE specific search space configurations may be signalled by gNB in RRC signalling or DCI or MAC CE.

If the secondary DRX group is not configured for a CG and a PDCCH indicating PDCCH skipping is received from a serving cell (of that CG), UE and gNB may perform the following operation:

UE and gNB may apply PDCCH skipping for all the serving cells of the CG (S750). The UE may skip PDCCH monitoring (and gNB skips PDCCH transmission for the UE) in the skipping duration for all the serving cells of the CG. The skipping duration may be common for all the serving cells or it may be specific to each serving cell. The skipping duration(s) may be signalled using RRC signalling and/or may be signalled in DCI indicating PDCCH skipping. For example, a list of one or more skipping durations may be signalled in RRC signalling message and one of the skipping duration to be applied from the list may be signalled in DCI indicating PDCCH skipping.

In an embodiment, in the skipping duration, UE may skip PDCCH monitoring addressed to $1^{st}$ set of RNTIs and may continue monitoring PDCCH (and gNB may transmit PDCCH for the UE) addressed to $2^{nd}$ set of RNTIs.

The $1^{st}$ and $2^{nd}$ set of RNTIs may be pre-defined.

In an embodiment, $2^{nd}$ set of RNTIs may include RNTIs (e.g. RA-RNTI, P-RNTI, SI-RNTI, SL-RNTI) other than RNTIs including C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI. $1^{st}$ set of RNTIs may include C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI.

In an embodiment, $1^{st}$ set of RNTIs may include all the RNTIs which UE monitors in RRC_CONNECTED.

In an embodiment, 1st set of RNTIs may include all the RNTIs which UE monitors in RRC_CONNECTED except RNTIs related to SL communication.

In an embodiment, in the skipping duration, UE may skip PDCCH monitoring (and gNB may skip PDCCH transmission for the UE) in the PDCCH monitoring occasions configured by UE specific search space configurations. In an embodiment, in the skipping duration, UE may skip PDCCH monitoring (and gNB may skip PDCCH transmission for the UE) in the PDCCH monitoring occasions configured by UE common search space configurations. In an embodiment, in the skipping duration, whether UE skips PDCCH monitoring (and gNB skips PDCCH transmission for the UE) in the PDCCH monitoring occasions configured by UE common search space configurations may be signalled by gNB in RRC signalling or DCI or MAC CE. In an embodiment, in the skipping duration, whether UE skips PDCCH monitoring (and gNB skips PDCCH transmission for the UE) in the PDCCH monitoring occasions configured by UE specific search space configurations may be signalled by gNB in RRC signalling or DCI or MAC CE.

In an embodiment, the above operation may also be applied in case PDCCH skipping indication is signalled using RRC signalling message or MAC CE instead of DCI by replacing PDCCH skipping indication in DCI with RRC signalling message or MAC CE in operation described in various embodiment of this method.

In an embodiment, in the above description, PDCCH indicating UE to switch to an empty SSSG (i.e. SSSG not configured with any search space sets) or default SSSG may be also considered as PDCCH skipping indication. Skipping duration may be defined by a timer in this case or it may be the timer duration until UE receives PDCCH indicating UE to switch to a non-empty SSSG or non-default SSSG.

In an embodiment, UE may receive PDCCH skipping indication from the gNB in RRC_INACTIVE and/or RRC_IDLE. For example, UE may receive the PDCCH skipping indication during the small data transmission procedure in RRC_INACTIVE. In this case UE may apply the PDCCH skipping for the camped cell. The UE may skip PDCCH monitoring (and gNB may skip PDCCH transmission for the UE) in the skipping duration. The skipping duration may be signaled in system information or in RRC Release message. The PDCCH skipping indication may be indicated in a wakeup signal or an early paging indication or in RAR or MsgB in RRC_INACTIVE and/or RRC_IDLE. In an embodiment, for small data transmission procedure in RRC_INACTIVE or in RRC_IDLE state, if RA is initiated for SDT, PDCCH skipping indication may be sent by gNB in between Msg4 (including contention resolution identity MAC CE) transmission or MsgB including contention resolution identity transmission and RRC Release message transmission. In an embodiment, for small data transmission procedure in RRC_INACTIVE state or in RRC_IDLE state, if RA is initiated for SDT, PDCCH skipping indication may be sent by gNB after the successful completion of random access procedure.

Figure 8:
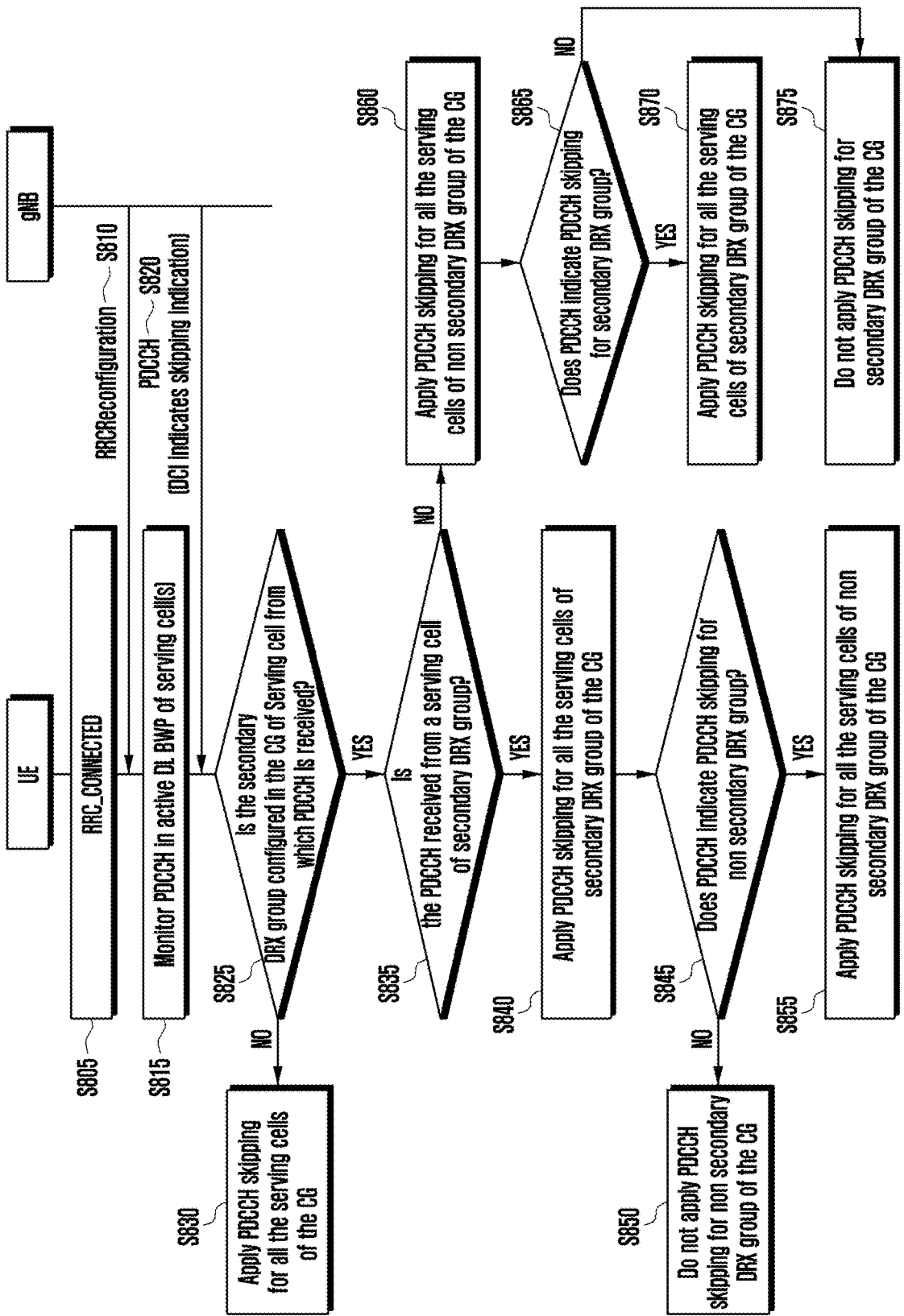
FIG. 8 illustrates an example of signalling flows between UE and gNB for skipping PDCCH monitoring for at least one DRX group, according to an embodiment of the disclosure.

Method 3:

FIG. 8 illustrates an example of signalling flows between UE and gNB for skipping PDCCH monitoring for at least one DRX group, according to an embodiment of the disclosure.

FIG. 8 is only an example to explain the disclosure, but does not limit the technical scope of the disclosure. At least one step of FIG. 8 may be omitted in some cases, or two or more steps may be merged and performed as one step. Also, the order of operation steps of FIG. 8 may be changed.

UE may be in RRC_CONNECTED state (S805).

UE may receive RRCReconfiguration message from gNB (S810). The RRCReconfiguration message may include secondaryDRX-GroupConfig in configuration of zero or more secondary cells of master cell group, and/or the RRCReconfiguration message may include secondaryDRX-GroupConfig in configuration of zero or more secondary cells of secondary cell group. One or more configured serving cells (other than SpCell) may be activated via RRC signalling or MAC CE.

UE may monitor PDCCH in the active DL BWP of SpCell and active DL BWP(s) of activated Secondary cell(s) (S815). The PDCCH may be monitored in PDCC monitoring occasions configured by one or more search space configurations of active DL BWP.

UE may receive PDCCH from gNB (S820). The DCI in the PDCCH may include/indicate PDCCH skipping. In an embodiment, in the RRC_CONNECTED state, UE may indicate to gNB using a dedicated RRC message (e.g. UE capability information message) whether the UE supports PDCCH skipping. UE may send the dedicated RRC message indicating whether UE supports PDCCH skipping upon request from gNB. UE may indicate to gNB whether the UE supports PDCCH skipping in Msg3 or MsgB transmitted to gNB during connection setup or connection resume. If gNB has received indication from UE that it supports PDCCH skipping, gNB may send PDCCH skipping indication in DCI.

UE may identify whether the secondary DRX group is configured in the CG of a serving cell from which the PDCCH is received (S825).

If the secondary DRX group is configured for a CG, UE may identify whether the PDCCH is received from a serving cell of the secondary DRX group (S835).

If the secondary DRX group is configured for a CG and a PDCCH indicating PDCCH skipping is received from a serving cell of the secondary DRX group of the CG, UE and gNB may perform the following operation:

UE and gNB may apply PDCCH skipping for all the serving cells of the secondary DRX group of the CG (S840). Specifically, the UE may skip PDCCH monitoring (and gNB may skip PDCCH transmission for the UE) in the skipping duration for all the serving cells of the secondary DRX group of the CG. The skipping duration may be common for all the serving cells or it may be specific to each serving cell. If PDCCH received from a serving cell of the secondary DRX group of the CG indicates PDCCH skipping for other DRX group (i.e. non secondary DRX group) (S845), UE and gNB also may apply PDCCH skipping for all the serving cells of non-secondary DRX group of the CG (S855). The UE may skip PDCCH monitoring (and gNB may skip PDCCH transmission for the UE) in the skipping duration for all the serving cells of the non-secondary DRX group of the CG. The skipping duration may be common for all the serving cells or it may be specific to each serving cell. If PDCCH received from a serving cell of the secondary DRX group of the CG does not indicate PDCCH skipping for other DRX group (i.e. non secondary DRX group) (S845), UE and gNB may not apply PDCCH skipping for all the serving cells of non-secondary DRX group of the CG (S850). The skipping duration(s) may be signalled using RRC signalling and/or may be signalled in DCI indicating PDCCH skipping. For example, a list of one or more skipping durations may be signalled in RRC signalling message and one of the skipping duration to be applied from the list may be signalled in DCI indicating PDCCH skipping.

In an embodiment, in the skipping duration, UE may skip PDCCH monitoring (and gNB may skip PDCCH transmission for the UE) addressed to $1^{st}$ set of RNTIs and may continue monitoring PDCCH (and gNB may transmit PDCCH for the UE) addressed to $2^{nd}$ set of RNTIs.

The $1^{st}$ and $2^{nd}$ set of RNTIs may be pre-defined.

In an embodiment, $2^{nd}$ set of RNTIs may include RNTIs (e.g. RA-RNTI, P-RNTI, SI-RNTI, SL-RNTI) other than RNTIs including C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI. $1^{st}$ set of RNTIs may include C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI.

In an embodiment, $1^{st}$ set of RNTIs may include all the RNTIs which UE monitors in RRC_CONNECTED.

In an embodiment, $1^{st}$ set of RNTIs may include all the RNTIs which UE monitors in RRC_CONNECTED except RNTIs related to SL communication.

In an embodiment, in the skipping duration, UE may skip PDCCH monitoring (and gNB may skip PDCCH transmission for the UE) in the PDCCH monitoring occasions configured by UE specific search space configurations. In an embodiment, in the skipping duration, UE may skip PDCCH monitoring (and gNB may skip PDCCH transmission for the UE) in the PDCCH monitoring occasions configured by UE common search space configurations. In an embodiment, in the skipping duration, whether UE skips PDCCH monitoring (and gNB skips PDCCH transmission for the UE) in the PDCCH monitoring occasions configured by UE common search space configurations may be signalled by gNB in RRC signalling or DCI or MAC CE. In an embodiment, in the skipping duration, whether UE skips PDCCH monitoring (and gNB skips PDCCH transmission for the UE) in the PDCCH monitoring occasions configured by UE specific search space configurations may be signalled by gNB in RRC signalling or DCI or MAC CE.

If the secondary DRX is configured for a CG and a PDCCH indicating PDCCH skipping is received from a serving cell of the non-secondary DRX group (i.e. DRX group other than the secondary DRX group) of the CG, UE and gNB may perform the following operation:

UE and gNB may apply PDCCH skipping for all the serving cells of the non-secondary DRX group of the CG (S860). The UE may skip PDCCH monitoring (and gNB may skip PDCCH transmission for the UE) in the skipping duration for all the serving cells of the non-secondary DRX group of the CG. The skipping duration may be common for all the serving cells or it may be specific to each serving cell. If PDCCH received from a serving cell of the non-secondary DRX group of the CG indicates PDCCH skipping for secondary DRX group (S865), UE and gNB may also apply PDCCH skipping for all the serving cells of secondary DRX group of the CG (S870). The UE may skip PDCCH monitoring (and gNB may skip PDCCH transmission for the UE) in the skipping duration for all the serving cells of the secondary DRX group of the CG. The skipping duration may be common for all the serving cells or it may be specific to each serving cell. If PDCCH received from a serving cell of the non-secondary DRX group of the CG does not indicate PDCCH skipping for secondary DRX group (S865), UE and gNB may not apply PDCCH skipping for all the serving cells of secondary DRX group of the CG (S875). The skipping duration(s) may be signalled using RRC signalling and/or may be signalled in DCI indicating PDCCH skipping. For example, a list of one or more skipping durations may be signalled in RRC signalling message and one of the skipping duration to be applied from the list may be signalled in DCI indicating PDCCH skipping.

In an embodiment, in the skipping duration, UE may skip PDCCH monitoring (and gNB may skip PDCCH transmission for the UE) addressed to $1^{st}$ set of RNTIs and may continue monitoring PDCCH (and gNB may transmit PDCCH for the UE) addressed to $2^{nd}$ set of RNTIs.

The $1^{st}$ and $2^{nd}$ set of RNTIs may be pre-defined.

In an embodiment, $2^{nd}$ set of RNTIs may include RNTIs (e.g. RA-RNTI, P-RNTI, SI-RNTI, SL-RNTI) other than RNTIs including C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI. $1^{st}$ set of RNTIs may include C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI.

In an embodiment, $1^{st}$ set of RNTIs may include all the RNTIs which UE monitors in RRC_CONNECTED.

In an embodiment, $1^{st}$ set of RNTIs may include all the RNTIs which UE monitors in RRC_CONNECTED except RNTIs related to SL communication.

In an embodiment, in the skipping duration, UE may skip PDCCH monitoring (and gNB may skip PDCCH transmission for the UE) in the PDCCH monitoring occasions configured by UE specific search space configurations. In an embodiment, in the skipping duration, UE may skip PDCCH monitoring (and gNB may skip PDCCH transmission for the UE) in the PDCCH monitoring occasions configured by UE common search space configurations. In an embodiment, in the skipping duration, whether UE skips PDCCH monitoring (and gNB skips PDCCH transmission for the UE) in the PDCCH monitoring occasions configured by UE common search space configurations may be signalled by gNB in RRC signalling or DCI or MAC CE. In an embodiment, in the skipping duration, whether UE skips PDCCH monitoring (and gNB skips PDCCH transmission for the UE) in the PDCCH monitoring occasions configured by UE specific search space configurations may be signalled by gNB in RRC signalling or DCI or MAC CE.

If the secondary DRX is not configured for a CG and a PDCCH indicating PDCCH skipping is received from a serving cell (of that CG), UE and gNB may perform the following operation:

UE and gNB may apply PDCCH skipping for all the serving cells of the CG (S830). The UE may skip PDCCH monitoring (and gNB may skip PDCCH transmission for the UE) in the skipping duration for all the serving cells of the CG. The skipping duration may be common for all the serving cells or it may be specific to each serving cell. The skipping duration(s) may be signalled using RRC signalling and/or may be signalled in DCI indicating PDCCH skipping. For example, a list of one or more skipping durations may be signalled in RRC signalling message and one of the skipping duration to be applied from the list may be signalled in DCI indicating PDCCH skipping.

In an embodiment, in the skipping duration, UE may skip PDCCH monitoring (and gNB may skip PDCCH transmission for the UE) addressed to $1^{st}$ set of RNTIs and may continue monitoring PDCCH (and gNB may transmit PDCCH for the UE) addressed to $2^{nd}$ set of RNTIs.

The $1^{st}$ and $2^{nd}$ set of RNTIs may be pre-defined.

In an embodiment, $2^{nd}$ set of RNTIs may include RNTIs (e.g. RA-RNTI, P-RNTI, SI-RNTI, SL-RNTI) other than RNTIs including C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI. $1^{st}$ set of RNTIs may include C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI.

In an embodiment, $1^{st}$ set of RNTIs may include all the RNTIs which UE monitors in RRC_CONNECTED.

In an embodiment, $1^{st}$ set of RNTIs may include all the RNTIs which UE monitors in RRC_CONNECTED except RNTIs related to SL communication.

In an embodiment, in the skipping duration, UE may skip PDCCH monitoring (and gNB may skip PDCCH transmission for the UE) in the PDCCH monitoring occasions configured by UE specific search space configurations. In an embodiment, in the skipping duration, UE may skip PDCCH monitoring (and gNB may skip PDCCH transmission for the UE) in the PDCCH monitoring occasions configured by UE common search space configurations. In an embodiment, in the skipping duration, whether UE skips PDCCH monitoring (and gNB skips PDCCH transmission for the UE) in the PDCCH monitoring occasions configured by UE common search space configurations may be signalled by gNB in RRC signalling or DCI or MAC CE. In an embodiment, in the skipping duration, whether UE skips PDCCH monitoring (and gNB skips PDCCH transmission for the UE) in the PDCCH monitoring occasions configured by UE specific search space configurations be signalled by gNB in RRC signalling or DCI or MAC CE.

In an embodiment, the above operation may also be applied in case PDCCH skipping indication is signalled using RRC signalling message or MAC CE instead of DCI by replacing PDCCH skipping indication in DCI with RRC signalling message or MAC CE in operation described in various embodiment of this method.

In an embodiment, in the above description, PDCCH indicating UE to switch to an empty SSSG (i.e. SSSG not configured with any search space sets) or default SSSG may be also considered as PDCCH skipping indication. Skipping duration may be defined by a timer in this case or it may be the timer duration until UE receives PDCCH indicating UE to switch to a non-empty SSSG or non-default SSSG.

In an embodiment, UE may receive PDCCH skipping indication from the gNB in RRC_INACTIVE and/or RRC_IDLE. For example, UE may receive the PDCCH skipping indication during the small data transmission procedure in RRC_INACTIVE. In this case UE may apply the PDCCH skipping for the camped cell. The UE may skip PDCCH monitoring (and gNB may skip PDCCH transmission for the UE) in the skipping duration. The skipping duration may be signaled in system information or in RRC Release message. The PDCCH skipping indication may be indicated in a wakeup signal or an early paging indication or in RAR or MsgB in RRC_INACTIVE and/or RRC_IDLE. In an embodiment, for small data transmission procedure in RRC_INACTIVE or in RRC_IDLE state, if RA is initiated for SDT, PDCCH skipping indication may be sent by gNB in between Msg4 (including contention resolution identity MAC CE) transmission or MsgB including contention resolution identity transmission and RRC Release message transmission. In an embodiment, for small data transmission procedure in RRC_INACTIVE state or in RRC_IDLE state, if RA is initiated for SDT, PDCCH skipping indication may be sent by gNB after the successful completion of random access procedure.

Method 4

Figure 9:
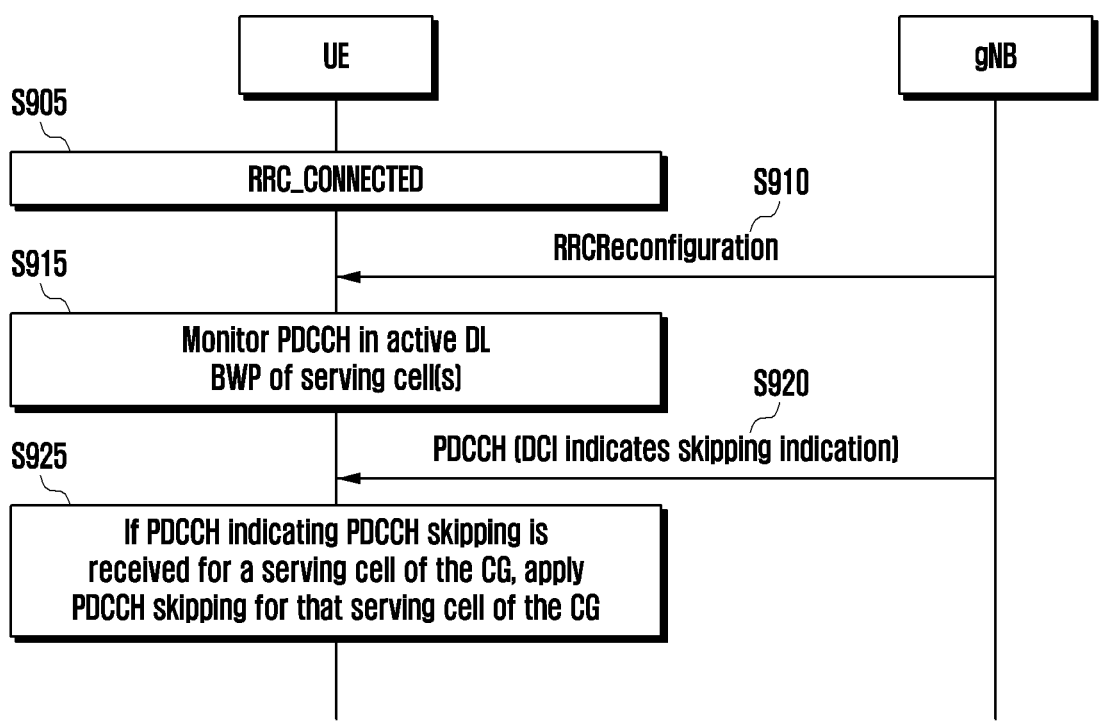
FIG. 9 illustrates another example of signalling flows between UE and gNB for skipping PDCCH monitoring, according to an embodiment of the disclosure.

FIG. 9 illustrates another example of signalling flows between UE and gNB for skipping PDCCH monitoring, according to an embodiment of the disclosure. Referring to FIG. 9, method 4 will be described.

FIG. 9 is only an example to explain the disclosure, but does not limit the technical scope of the disclosure. At least one step of FIG. 9 may be omitted in some cases, or two or more steps may be merged and performed as one step. Also, the order of operation steps of FIG. 9 may be changed.

UE may be in RRC_CONNECTED state (S905).

UE may receive RRCReconfiguration message from gNB (S910). The RRCReconfiguration message may include secondaryDRX-GroupConfig in configuration of zero or more secondary cells of master cell group, and/or the RRCReconfiguration message may include secondaryDRX-GroupConfig in configuration of zero or more secondary cells of secondary cell group. One or more configured serving cells (other than SpCell) may be activated via RRC signalling or MAC CE.

UE may monitor PDCCH in the active DL BWP of SpCell and active DL BWP(s) of activated Secondary cell(s) (S915). The PDCCH may be monitored in PDCC monitoring occasions configured by one or more search space configurations of active DL BWP.

UE may receive PDCCH from a serving cell (S920) wherein the DCI in the PDCCH may include/indicate PDCCH skipping. In an embodiment, in the RRC_CONNECTED state, UE may indicate to gNB using a dedicated RRC message whether UE supports PDCCH skipping. UE may send the dedicated RRC message indicating whether UE supports PDCCH skipping upon request from gNB. UE may indicate to gNB whether the UE supports PDCCH skipping in Msg3 or MsgB transmitted to gNB during connection setup or connection resume. If gNB has received indication from UE that it supports PDCCH skipping, gNB may send PDCCH skipping indication in DCI.

If the PDCCH indicating PDCCH skipping is received for a serving cell of the CG, UE and gNB may apply PDCCH skipping for that serving cell of the CG (S925).

For example, PDCCH indicating PDCCH skipping is received from serving cell X (i.e. it is received on PDCCH resources of active DL BWP of serving cell X), and the PDCCH is for serving cell Y (i.e. the PDCCH schedules PDSCH resources or PUSCH resources for serving cell Y or the carrier index field in DCI of received PDCCH is for the serving cell Y), then, PDCCH skipping is applied to serving cell Y. The UE skips PDCCH monitoring (and gNB skips PDCCH transmission for the UE) in the skipping duration.

For another example, PDCCH indicating PDCCH skipping is received on serving cell X (i.e. it is received on PDCCH resources of active DL BWP of serving cell X) and the PDCCH is for serving cell X (i.e. the PDCCH schedules PDSCH resources or PUSCH resources for serving cell X or the carrier index field in DCI of received PDCCH is for the serving cell X or the carrier index field is absent in DCI of received PDCCH), then, PDCCH skipping is applied to serving cell X. The UE skips PDCCH monitoring (and gNB skips PDCCH transmission for the UE) in the skipping duration.

The skipping duration may be signalled using RRC signalling and/or may be signalled in DCI indicating PDCCH skipping. For example, a list of one or more skipping durations may be signalled in RRC signalling message and one of the skipping duration to be applied from the list may be signalled in DCI indicating PDCCH skipping.

In an embodiment, in the skipping duration, UE may skip PDCCH monitoring (and gNB may skip PDCCH transmission for the UE) addressed to $1^{st}$ set of RNTIs and may continue monitoring PDCCH (and gNB may transmit PDCCH for the UE) addressed to $2^{nd}$ set of RNTIs.

The $1^{st}$ and $2^{nd}$ set of RNTIs may be pre-defined.

In an embodiment, $2^{nd}$ set of RNTIs may include RNTIs (e.g. RA-RNTI, P-RNTI, SI-RNTI, SL-RNTI) other than RNTIs including C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI. $1^{st}$ set of RNTIs may include C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI.

In an embodiment, $1^{st}$ set of RNTIs may include all the RNTIs which UE monitors in RRC_CONNECTED.

In an embodiment, $1^{st}$ set of RNTIs may include all the RNTIs which UE monitors in RRC_CONNECTED except RNTIs related to SL communication.

In an embodiment, in the skipping duration, UE may skip PDCCH monitoring (and gNB may skip PDCCH transmission for the UE) in the PDCCH monitoring occasions configured by UE specific search space configurations. In an embodiment, in the skipping duration, UE may skip PDCCH monitoring (and gNB may skip PDCCH transmission for the UE) in the PDCCH monitoring occasions configured by UE common search space configurations. In an embodiment, in the skipping duration, whether UE skips PDCCH monitoring (and gNB skips PDCCH transmission for the UE) in the PDCCH monitoring occasions configured by UE common search space configurations may be signalled by gNB in RRC signalling or DCI or MAC CE. In an embodiment, in the skipping duration, whether UE skips PDCCH monitoring (and gNB skips PDCCH transmission for the UE) in the PDCCH monitoring occasions configured by UE specific search space configurations may be signalled by gNB in RRC signalling or DCI or MAC CE.

In an embodiment, the above operation may also be applied in case PDCCH skipping indication is signalled using RRC signalling message or MAC CE instead of DCI by replacing PDCCH skipping indication in DCI with RRC signalling message or MAC CE in operation described in various embodiment of this method.

In an embodiment, in the above description, PDCCH indicating UE to switch to an empty SSSG (i.e. SSSG not configured with any search space sets) or default SSSG may be also considered as PDCCH skipping indication. Skipping duration may be defined by a timer in this case or it may be the timer duration until UE receives PDCCH indicating UE to switch to a non-empty SSSG or non-default SSSG.

In an embodiment, UE may receive PDCCH skipping indication from the gNB in RRC_INACTIVE and/or RRC_IDLE. For example, UE may receive the PDCCH skipping indication during the small data transmission procedure in RRC_INACTIVE. In this case UE applies the PDCCH skipping for the camped cell. The UE skips PDCCH monitoring (and gNB skips PDCCH transmission for the UE) in the skipping duration. The skipping duration may be signaled in system information or in RRC Release message. The PDCCH skipping indication may be indicated in a wakeup signal or an early paging indication or in RAR or MsgB in RRC_INACTIVE and/or RRC_IDLE. In an embodiment, for small data transmission procedure in RRC_INACTIVE or in RRC_IDLE state, if RA is initiated for SDT, PDCCH skipping indication may be sent by gNB in between Msg4 (including contention resolution identity MAC CE) transmission or MsgB including contention resolution identity transmission and RRC Release message transmission. In an embodiment, for small data transmission procedure in RRC_INACTIVE state or in RRC_IDLE state, if RA is initiated for SDT, PDCCH skipping indication may be sent by GNB after the successful completion of random access procedure.

Method 5

Figure 10:
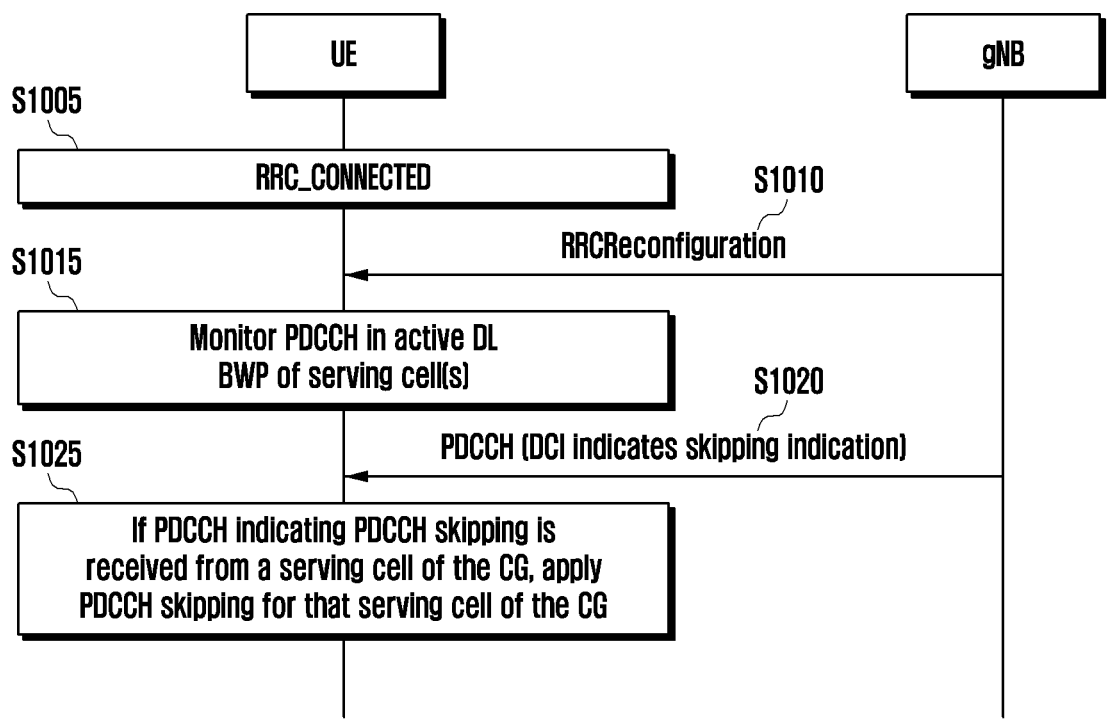
FIG. 10 illustrates another example of signalling flows between UE and gNB for skipping PDCCH monitoring, according to an embodiment of the disclosure.

FIG. 10 illustrates another example of signalling flows between UE and gNB for skipping PDCCH monitoring, according to an embodiment of the disclosure. Referring to FIG. 10, method 5 will be described.

FIG. 10 is only an example to explain the disclosure, but does not limit the technical scope of the disclosure. At least one step of FIG. 10 may be omitted in some cases, or two or more steps may be merged and performed as one step. Also, the order of operation steps of FIG. 10 may be changed.

UE may be in RRC_CONNECTED state (S1005).

UE may receive RRCReconfiguration message from gNB (S1010). The RRCReconfiguration message may include secondaryDRX-GroupConfig in configuration of zero or more secondary cells of master cell group, and/or the RRCReconfiguration message may include secondaryDRX-GroupConfig in configuration of zero or more secondary cells of secondary cell group. One or more configured serving cells (other than SpCell) may be activated via RRC signalling or MAC CE.

UE may monitor PDCCH in the active DL BWP of SpCell and active DL BWP(s) of activated Secondary cell(s) (S1015). The PDCCH may be monitored in PDCCH monitoring occasions configured by one or more search space configurations of active DL BWP.

UE may receive PDCCH from a serving cell (S1020). The DCI in the PDCCH may include/indicate PDCCH skipping. In an embodiment, in the RRC_CONNECTED state, UE may indicate to gNB using a dedicated RRC message whether the UE supports PDCCH skipping. UE may send the dedicated RRC message indicating whether UE supports PDCCH skipping upon request from gNB. UE may indicate to gNB whether the UE supports PDCCH skipping in Msg3 or MsgB transmitted to gNB during connection setup or connection resume. If gNB has received indication from UE that it supports PDCCH skipping, gNB may send PDCCH skipping indication in DCI.

If the PDCCH including DCI which indicates PDCCH skipping is received from a serving cell of the CG, UE and gNB may apply PDCCH skipping for that serving cell of the CG (S1025).

For example, in case that a PDCCH indicating PDCCH skipping is received from serving cell X (i.e. it is received on PDCCH resources of active DL BWP of serving cell X), and the PDCCH is for serving cell Y (i.e. the PDCCH schedules PDSCH resources or PUSCH resources for serving cell Y or the carrier index field in DCI of received PDCCH is for the serving cell Y), then, PDCCH skipping is applied to serving cell X.

For another example, in case that a PDCCH indicating PDCCH skipping is received from serving cell X (i.e. it is received on PDCCH resources of active DL BWP of serving cell X), and the PDCCH is for serving cell X (i.e. PDCCH schedules PDSCH resources or PUSCH resources for serving cell X or the carrier index field in DCI of received PDCCH is for the serving cell X or the carrier index field is absent in DCI of received PDCCH), then, PDCCH skipping is applied to serving cell X.

The skipping duration may be signalled using RRC signalling and/or may be signalled in DCI indicating PDCCH skipping. For example, a list of one or more skipping durations may be signalled in RRC signalling message and one of the skipping duration to be applied from the list may be signalled in DCI indicating PDCCH skipping.

In an embodiment, in the skipping duration, UE may skip PDCCH monitoring addressed to $1^{st}$ set of RNTIs (and gNB may skip PDCCH transmission for the UE) and may continue monitoring PDCCH (and gNB may transmit PDCCH for the UE) addressed to $2^{nd}$ set of RNTIs.

The $1^{st}$ and $2^{nd}$ set of RNTIs may be pre-defined.

In an embodiment, $2^{nd}$ set of RNTIs may include RNTIs (e.g. RA-RNTI, P-RNTI, SI-RNTI, SL-RNTI) other than RNTIs including C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI. $1^{st}$ set of RNTIs may include C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI.

In an embodiment, $1^{st}$ set of RNTIs may include all the RNTIs which UE monitors in RRC_CONNECTED.

In an embodiment, $1^{st}$ set of RNTIs may include all the RNTIs which UE monitors in RRC_CONNECTED except RNTIs related to SL communication.

In an embodiment, in the skipping duration, UE may skip PDCCH monitoring (and gNB may skip PDCCH transmission for the UE) in the PDCCH monitoring occasions configured by UE specific search space configurations. In an embodiment, in the skipping duration, UE may skip PDCCH monitoring (and gNB may skip PDCCH transmission for the UE) in the PDCCH monitoring occasions configured by UE common search space configurations. In an embodiment, in the skipping duration, whether UE skips PDCCH monitoring (and gNB skips PDCCH transmission for the UE) in the PDCCH monitoring occasions configured by UE common search space configurations may be signalled by gNB in RRC signalling or DCI or MAC CE. In an embodiment, in the skipping duration, whether UE skips PDCCH monitoring (and gNB skips PDCCH transmission for the UE) in the PDCCH monitoring occasions configured by UE specific search space configurations may be signalled by gNB in RRC signalling or DCI or MAC CE.

In an embodiment, the above operation may also be applied in case PDCCH skipping indication is signalled using RRC signalling message or MAC CE instead of DCI by replacing PDCCH skipping indication in DCI with RRC signalling message or MAC CE in operation described in various embodiment of this method.

In an embodiment, in the above description, PDCCH indicating UE to switch to an empty SSSG (i.e. SSSG not configured with any search space sets) or default SSSG may be also considered as PDCCH skipping indication. Skipping duration may be defined by a timer in this case or it may be the timer duration until UE receives PDCCH indicating UE to switch to a non-empty SSSG or non-default SSSG.

In an embodiment, UE may receive PDCCH skipping indication from the gNB in RRC_INACTIVE and/or RRC_IDLE. For example, UE may receive the PDCCH skipping indication during the small data transmission procedure in RRC_INACTIVE. In this case UE applies the PDCCH skipping for the camped cell. The UE skips PDCCH monitoring (and gNB skips PDCCH transmission for the UE) in the skipping duration. The skipping duration may be signaled in system information or in RRC Release message. The PDCCH skipping indication may be indicated in a wakeup signal or an early paging indication or in RAR or MsgB in RRC_INACTIVE and/or RRC_IDLE. In an embodiment, for small data transmission procedure in RRC_INACTIVE or in RRC_IDLE state, if RA is initiated for SDT, PDCCH skipping indication may be sent by gNB in between Msg4 (including contention resolution identity MAC CE) transmission or MsgB including contention resolution identity transmission and RRC Release message transmission. In an embodiment, for small data transmission procedure in RRC_INACTIVE state or in RRC_IDLE state, if RA is initiated for SDT, PDCCH skipping indication may be sent by gNB after the successful completion of random access procedure.

Method 6

Figure 11:
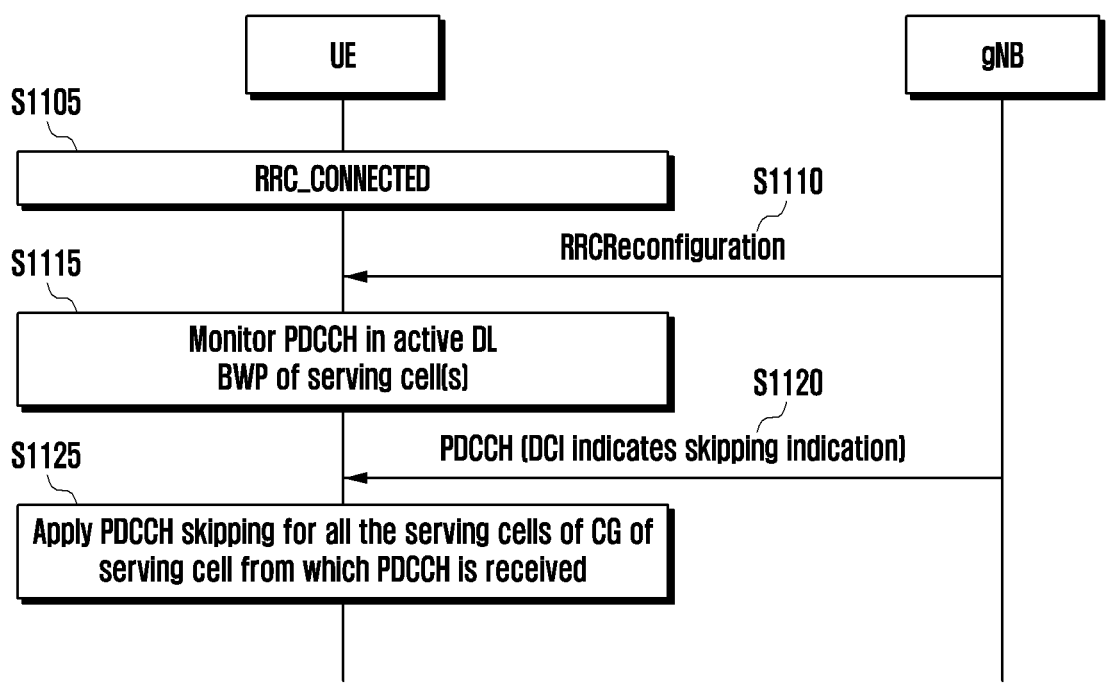
FIG. 11 illustrates another example of signalling flows between UE and gNB for skipping PDCCH monitoring, according to an embodiment of the disclosure.

FIG. 11 illustrates another example of signalling flows between UE and gNB for skipping PDCCH monitoring, according to an embodiment of the disclosure. Referring to FIG. 11, method 6 will be described.

FIG. 11 is only an example to explain the disclosure, but does not limit the technical scope of the disclosure. At least one step of FIG. 11 may be omitted in some cases, or two or more steps may be merged and performed as one step. Also, the order of operation steps of FIG. 11 may be changed.

UE may be in RRC_CONNECTED state (S1105).

UE may receive RRCReconfiguration message from gNB (S1110). The RRCReconfiguration message may include secondaryDRX-GroupConfig in configuration of zero or more secondary cells of master cell group, and/or the RRCReconfiguration message may include secondaryDRX-GroupConfig in configuration of zero or more secondary cells of secondary cell group. One or more configured serving cells (other than SpCell) may be activated via RRC signalling or MAC CE.

UE may monitor PDCCH in the active DL BWP of SpCell and active DL BWP(s) of activated Secondary cell(s) (S1115). The PDCCH may be monitored in PDCC monitoring occasions configured by one or more search space configurations of active DL BWP.

UE may receive PDCCH from a serving cell (S1120). The DCI in the PDCCH may include/indicate PDCCH skipping. In an embodiment, in the RRC_CONNECTED state, UE may indicate to gNB using a dedicated RRC message whether the UE supports PDCCH skipping. UE may send the dedicated RRC message indicating whether UE supports PDCCH skipping upon request from gNB. UE may indicate to gNB whether the UE supports PDCCH skipping in Msg3 or MsgB transmitted to gNB during connection setup or connection resume. If gNB has received indication from UE that it supports PDCCH skipping, gNB may send PDCCH skipping indication in DCI.

If PDCCH indicating PDCCH skipping is received from a serving cell (of that CG), UE and gNB may perform the following operation:

UE and gNB may apply PDCCH skipping for all the serving cells of the CG (S1125). The UE may skip PDCCH monitoring (and gNB may skip PDCCH transmission for the UE) in the skipping duration for all the serving cells of the CG. The skipping duration may be common for all the serving cells or it may be specific to each serving cell. The skipping duration(s) may be signalled using RRC signalling and/or may be signalled in DCI indicating PDCCH skipping. For example, a list of one or more skipping durations may be signalled in RRC signalling message and one of the skipping duration to be applied from the list may be signalled in DCI indicating PDCCH skipping.

In an embodiment, in the skipping duration, UE may skip PDCCH monitoring (and gNB may skip PDCCH transmission for the UE) addressed to $1^{st}$ set of RNTIs and may continue monitoring PDCCH (and gNB may transmit PDCCH for the UE) addressed to $2^{nd}$ set of RNTIs.

The $1^{st}$ and $2^{nd}$ set of RNTIs may be pre-defined.

In an embodiment, $2^{nd}$ set of RNTIs may include RNTIs (e.g. RA-RNTI, P-RNTI, SI-RNTI, SL-RNTI) other than RNTIs including C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI. $1^{st}$ set of RNTIs may include C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI.

In an embodiment, $1^{st}$ set of RNTIs may include all the RNTIs which UE monitors in RRC_CONNECTED.

In an embodiment, $1^{st}$ set of RNTIs may include all the RNTIs which UE monitors in RRC_CONNECTED except RNTIs related to SL communication.

In an embodiment, in the skipping duration, UE may skip PDCCH monitoring (and gNB may skip PDCCH transmission for the UE) in the PDCCH monitoring occasions configured by UE specific search space configurations. In an embodiment, in the skipping duration, UE may skip PDCCH monitoring (and gNB may skip PDCCH transmission for the UE) in the PDCCH monitoring occasions configured by UE common search space configurations. In an embodiment, in the skipping duration, whether UE skips PDCCH monitoring (and gNB skips PDCCH transmission for the UE) in the PDCCH monitoring occasions configured by UE common search space configurations may be signalled by gNB in RRC signalling or DCI or MAC CE. In an embodiment, in the skipping duration, whether UE skips PDCCH monitoring (and gNB skips PDCCH transmission for the UE) in the PDCCH monitoring occasions configured by UE specific search space configurations may be signalled by gNB in RRC signalling or DCI or MAC CE.

In an embodiment, the above operation may also be applied in case PDCCH skipping indication is signalled using RRC signalling message or MAC CE instead of DCI by replacing PDCCH skipping indication in DCI with RRC signalling message or MAC CE in operation described in various embodiment of this method.

In an embodiment, in the above description, PDCCH indicating UE to switch to an empty SSSG (i.e. SSSG not configured with any search space sets) or default SSSG may be also considered as PDCCH skipping indication. Skipping duration may be defined by a timer in this case or it may be the timer duration until UE receives PDCCH indicating UE to switch to a non-empty SSSG or non-default SSSG.

In an embodiment, UE may receive PDCCH skipping indication from the gNB in RRC_INACTIVE and/or RRC_IDLE. For example, UE may receive the PDCCH skipping indication during the small data transmission procedure in RRC_INACTIVE. In this case UE applies the PDCCH skipping for the camped cell. The UE skips PDCCH monitoring (and gNB skips PDCCH transmission for the UE) in the skipping duration. The skipping duration may be signaled in system information or in RRC Release message. The PDCCH skipping indication may be indicated in a wakeup signal or an early paging indication or in RAR or MsgB in RRC_INACTIVE and/or RRC_IDLE. In an embodiment, for small data transmission procedure in RRC_INACTIVE or in RRC_IDLE state, if RA is initiated for SDT, PDCCH skipping indication may be sent by gNB in between Msg4 (including contention resolution identity MAC CE) transmission or MsgB including contention resolution identity transmission and RRC Release message transmission. In an embodiment, for small data transmission procedure in RRC_INACTIVE state or in RRC_IDLE state, if RA is initiated for SDT, PDCCH skipping indication may be sent by gNB after the successful completion of random access procedure.

Method 7

UE may be in RRC_CONNECTED state.

UE may receive RRCReconfiguration message from gNB. The RRCReconfiguration message may include secondaryDRX-GroupConfig in configuration of zero or more secondary cells of master cell group, and/or the RRCReconfiguration message may include secondaryDRX-GroupConfig in configuration of zero or more secondary cells of secondary cell group. One or more configured serving cells (other than SpCell) may be activated via RRC signalling or MAC CE.

UE may monitor PDCCH in the active DL BWP of SpCell and active DL BWP(s) of activated Secondary cell(s). The PDCCH may be monitored in PDCC monitoring occasions configured by one or more search space configurations of active DL BWP.

UE may receive PDCCH from a serving cell wherein the DCI in the PDCCH may include/indicate PDCCH skipping. In an embodiment, in the RRC_CONNECTED state, UE may indicate to gNB using a dedicated RRC message whether UE supports PDCCH skipping. UE may send the dedicated RRC message indicating whether UE supports PDCCH skipping upon request from gNB. UE may indicate to gNB whether the UE supports PDCCH skipping in Msg3 or MsgB transmitted to gNB during connection setup or connection resume. If gNB has received indication from UE that it supports PDCCH skipping, gNB may send PDCCH skipping indication in DCI.

If PDCCH indicating PDCCH skipping is received from a serving cell (of that CG), UE and gNB may perform the following operation:

UE and gNB may apply PDCCH skipping for one or more serving cells of the CG which are indicated by DCI. The DCI may include one or more skipping indication bits, where each bit is mapped to one or more serving cells. The RRC Reconfiguration message may indicate which bit in the DCI corresponds to which serving cell. If the PDCCH skipping indication bit corresponding to a serving cell is set to 1, UE may apply PDCCH skipping for that serving cell. The UE may skip PDCCH monitoring (and gNB may skip PDCCH transmission for the UE) in the skipping duration for that serving cell. The skipping duration may be common for all the serving cells or it may be specific to each serving cell. The skipping duration(s) may be signalled using RRC signalling and/or may be signalled in DCI indicating PDCCH skipping. For example, a list of one or more skipping durations may be signalled in RRC signalling message and one of the skipping duration to be applied from the list may be signalled in DCI indicating PDCCH skipping.

In an embodiment, in the skipping duration, UE may skip PDCCH monitoring (and gNB may skip PDCCH transmission for the UE) addressed to $1^{st}$ set of RNTIs and may continue monitoring PDCCH (and gNB may transmit PDCCH for the UE) addressed to $2^{nd}$ set of RNTIs.

The $1^{st}$ and $2^{nd}$ set of RNTIs may be pre-defined.

In an embodiment, $2^{nd}$ set of RNTIs may include RNTIs (e.g. RA-RNTI, P-RNTI, SI-RNTI, SL-RNTI) other than RNTIs including C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI. $1^{st}$ set of RNTIs may include C-RNTI, CI-RNTI, CS-RNTI, INT-RNTI, SFI-RNTI, SP-CSI-RNTI, TPC-PUCCH-RNTI, TPC-PUSCH-RNTI, TPCSRS-RNTI, and AI-RNTI.

In an embodiment, $1^{st}$ set of RNTIs may include all the RNTIs which UE monitors in RRC_CONNECTED.

In an embodiment, $1^{st}$ set of RNTIs may include all the RNTIs which UE monitors in RRC_CONNECTED except RNTIs related to SL communication.

In an embodiment, in the skipping duration, UE may skip PDCCH monitoring (and gNB may skip PDCCH transmission for the UE) in the PDCCH monitoring occasions configured by UE specific search space configurations. In an embodiment, in the skipping duration, UE may skip PDCCH monitoring (and gNB may skip PDCCH transmission for the UE) in the PDCCH monitoring occasions configured by UE common search space configurations. In an embodiment, in the skipping duration, whether UE skips PDCCH monitoring (and gNB skips PDCCH transmission for the UE) in the PDCCH monitoring occasions configured by UE common search space configurations may be signalled by gNB in RRC signalling or DCI or MAC CE. In an embodiment, in the skipping duration, whether UE skips PDCCH monitoring (and gNB skips PDCCH transmission for the UE) in the PDCCH monitoring occasions configured by UE specific search space configurations may be signalled by gNB in RRC signalling or DCI or MAC CE.

In an embodiment, the above operation may also be applied in case PDCCH skipping indication is signalled using RRC signalling message or MAC CE instead of DCI by replacing PDCCH skipping indication in DCI with RRC signalling message or MAC CE in operation described in various embodiment of this method.

In an embodiment, PDCCH indicating UE to switch to an empty SSSG (i.e. SSSG not configured with any search space sets) or default SSSG may be also considered as PDCCH skipping indication. Skipping duration may be defined by a timer in this case or it may be the timer duration until UE receives PDCCH indicating UE to switch to a non-empty SSSG or non-default SSSG.

In an embodiment, UE may receive PDCCH skipping indication from the gNB in RRC_INACTIVE and/or RRC_IDLE. For example, UE may receive the PDCCH skipping indication during the small data transmission procedure in RRC_INACTIVE. In this case UE applies the PDCCH skipping for the camped cell. The UE skips PDCCH monitoring (and gNB skips PDCCH transmission for the UE) in the skipping duration. The skipping duration may be signaled in system information or in RRC Release message. The PDCCH skipping indication may be indicated in a wakeup signal or an early paging indication or in RAR or MsgB in RRC_INACTIVE and/or RRC_IDLE. In an embodiment, for small data transmission procedure in RRC_INACTIVE or in RRC_IDLE state, if RA is initiated for SDT, PDCCH skipping indication may be sent by gNB in between Msg4 (including contention resolution identity MAC CE) transmission or MsgB including contention resolution identity transmission and RRC Release message transmission. In an embodiment, for small data transmission procedure in RRC_INACTIVE state or in RRC_IDLE state, if RA is initiated for SDT, PDCCH skipping indication may be sent by gNB after the successful completion of random access procedure.

In an embodiment, in methods 1 to 7, during the PDCCH skipping duration for a serving cell X, if drx-RetransmissionTimerDL or drx-RetransmissionTimerUL is running for a HARQ process of the serving cell X, UE monitors PDCCH (i.e. UE does not skip PDCCH monitoring or gNB cancels/suspends PDCCH skipping) on serving cell X while the drx-RetransmissionTimerDL or drx-RetransmissionTimerUL is running.

In methods 1 to 7, during the PDCCH skipping duration for a serving cell X, if drx-RetransmissionTimerDL or drx-RetransmissionTimerUL is running for a HARQ process of the serving cell X, UE monitors PDCCH (i.e. UE does not skip PDCCH monitoring or gNB cancels/suspends PDCCH skipping indication) on serving cell X during the PDCCH skipping duration.

In methods 1 to 7, during the PDCCH skipping duration for a serving cell X, if drx-RetransmissionTimerDL or drx-RetransmissionTimerUL is running for a HARQ process of the serving cell X, UE monitors PDCCH (i.e. UE does not skip PDCCH monitoring or gNB cancels/suspends PDCCH skipping indication) on all serving cells of CG during the PDCCH skipping duration.

In methods 1 to 7, during the PDCCH skipping duration for a serving cell X, if drx-RetransmissionTimerDL or drx-RetransmissionTimerUL is running for a HARQ process of the serving cell X, UE monitors PDCCH (i.e. UE does not skip PDCCH monitoring or gNB cancels/suspends PDCCH skipping indication) on all serving cells of DRX group associated with a serving cell X during the PDCCH skipping duration.

Features of the above described embodiments, methods and aspects can be combined unless their combining results in evident technical conflicts. In addition, each of the above described embodiments, methods and aspects may be performed independently, or two or more embodiments, methods or aspects may be combined and performed.

Figure 12:
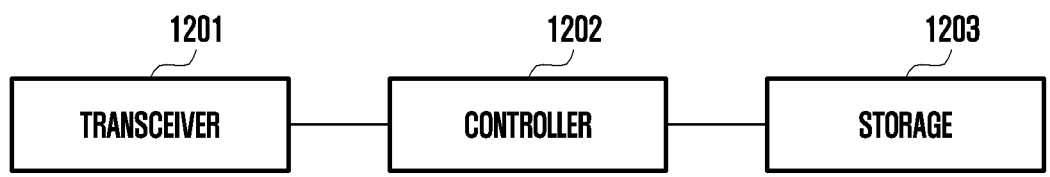
FIG. 12 is a diagram illustrating the structure of a UE according to an embodiment of the disclosure.

FIG. 12 is a diagram illustrating the structure of a UE according to an embodiment of the disclosure.

Referring to FIG. 12, the UE may include a transceiver 1201, a controller 1202, and a storage 1203. However, the components of the UE are not limited to the above-described examples. For example, the UE may include more or fewer components than the aforementioned components. Further, the transceiver 1201, the controller 1202, and the storage 1203 may be implemented in the form of a single chip. For example, the controller 1202 may be defined as a circuit or application-specific integrated circuit or at least one processor.

The transceiver 1201 may transmit and receive signals to and from another network entity. For example, the transceiver 1201 may receive RRC signaling being broadcasted from a base station according to an embodiment of the disclosure. For example, the transceiver 1201 may receive downlink control information (DCI) including information that indicates skipping physical downlink control channel (PDCCH) monitoring for a duration.

The controller 1202 may be configured to control operations of the UE according to embodiments and/or methods (e.g., methods 1/2/3/4/5/6/7) of the disclosure. For example, the controller 1202 may control signal flow between respective blocks so as to perform an operation according to the above-described drawings and flowcharts. Specifically, the controller 1202 may configured to identify that one or more cells are configured. The controller 1202 may configured to skip the PDCCH monitoring for the duration on the serving cell based on the DCI. For example, the controller 1202 may configured to skip monitoring a PDCCH associated with one of a C-RNTI, a CI-RNTI, a CS-RNTI, an INT-RNTI, a SFI-RNTI, a SP-CSI-RNTI, a TPC-PUCCH-RNTI, a TPC-PUSCH-RNTI, a TPC-SRS-RNTI, or an AI-RNTI, for the duration on the serving cell. For example, the controller 1202 may configured to monitor a PDCCH for DCI addressed to a SI-RNTI or a P-RNTI during the duration on the serving cell. For example, the controller 1202 may configured to transmit a message indicating whether the UE supports skipping of the PDCCH monitoring.

The storage 1203 may store at least one of information being transmitted and received through the transceiver 1201 and information being generated through the controller 1202. In an embodiment, the storage comprises one or more memories.

Figure 13:
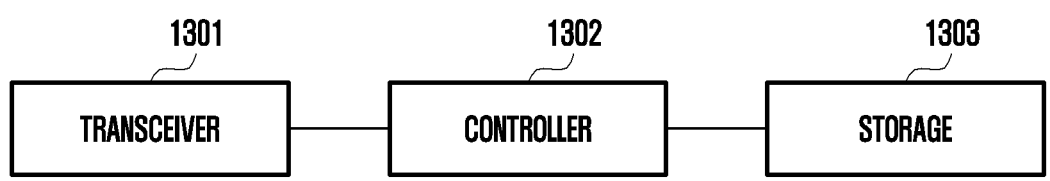
FIG. 13 is a diagram illustrating the structure of a base station according to an embodiment of the disclosure.

FIG. 13 is a diagram illustrating the structure of a base station according to an embodiment of the disclosure.

Referring to FIG. 13, the base station may include a transceiver 1301, a controller 1302, and a storage 1303. However, the components of the base station are not limited to the above-described examples. For example, the base station may include more or fewer components than the aforementioned components. Further, the transceiver 1301, the controller 1302, and the storage 1303 may be implemented in the form of a single chip. For example, the controller 1302 may be defined as a circuit or application-specific integrated circuit or at least one processor.

The transceiver 1301 may transmit and receive signals to and from another network entity. For example, the transceiver 1301 may transmit downlink control information (DCI) including information that indicates skipping physical downlink control channel (PDCCH) monitoring for a duration.

The controller 1302 may be configured to control operations of the base station according to embodiments and/or methods (e.g., methods 1/2/3/4/5/6/7) of the disclosure. For example, the controller 1302 may control signal flow between respective blocks so as to perform an operation according to the above-described drawings and flowcharts. Specifically, the controller 1302 may configured to identify that one or more cells are configured to the UE. The controller 1302 may configured to skip transmitting a PDCCH for a duration on the serving cell. For example, the PDCCH whose transmission is skipped is associated with one of a C-RNTI, a CI-RNTI, a CS-RNTI, an INT-RNTI, a SFI-RNTI, a SP-CSI-RNTI, a TPC-PUCCH-RNTI, a TPC-PUSCH-RNTI, a TPC-SRS-RNTI, or an AI-RNTI. For example, the controller 1302 may configured to receive a message indicating whether the UE supports skipping of the PDCCH monitoring.

The storage 1303 may store at least one of information being transmitted and received through the transceiver 1301 and information being generated through the controller 1302. In an embodiment, the storage comprises one or more memories.

In the above-described detailed embodiments of the disclosure, the elements included in the disclosure may be expressed in the singular or plural form depending on the proposed detailed embodiment. However, the singular or plural expression has been selected suitably for a situation proposed for convenience of description, and the disclosure is not limited to the singular or plural elements. Although an element has been expressed in the plural form, it may be configured in the singular form. Although an element has been expressed in the singular form, it may be configured in the plural form.

Meanwhile, although the detailed embodiments have been described in the detailed description of the disclosure, the disclosure may be modified in various ways without departing from the scope of the disclosure. Accordingly, the scope of the disclosure should not be limited to the above-described embodiments, but should be defined by not only claims but also equivalents thereof.

The invention claimed is:

1. A method performed by a user equipment (UE) in a wireless communication system, the method comprising:
  receiving information on a skipping duration:
  identifying that a plurality of cells are configured;
  receiving, on a first serving cell among the plurality of cells, downlink control information (DCI) scheduling a physical downlink shared channel (PDSCH) or a physical uplink shared channel (PUSCH) for a second serving cell among the plurality of cells, the DCI including information that indicates skipping physical downlink control channel (PDCCH) monitoring; and
  skipping monitoring of a PDCCH on the first serving cell for the skipping duration based on the DCI scheduling the PDSCH or the PUSCH for the second serving cell,
  wherein the PDCCH for which monitoring is skipped excludes a PDCCH for DCI addressed to a system information (SI)-radio network temporary identifier (RNTI) and a paging RNTI (P-RNTI).

2. The method of claim 1,
  wherein the skipping of monitoring of the PDCCH comprises skipping monitoring of a PDCCH associated with one of a cell RNTI (C-RNTI), a cancellation indication RNTI (CI-RNTI), a configured scheduling RNTI (CS-RNTI), an interruption RNTI (INT-RNTI), a slot format indication RNTI (SFI-RNTI), a semi-persistent channel state information RNTI (SP-CSI-RNTI), a transmit power control-physical uplink control channel RNTI (TPC-PUCCH-RNTI), a transmit power control-physical uplink shared channel RNTI (TPC-PUSCH-RNTI), a transmit power control-sounding reference signal RNTI (TPC-SRS-RNTI), or an availability indication RNTI (AI-RNTI).

3. The method of claim 1, further comprising:
  transmitting a message indicating whether the UE supports skipping of the PDCCH monitoring.

4. The method of claim 1, further comprising:
identifying a cell group of the first serving cell from which a PDCCH including the DCI is received; and
skipping PDCCH monitoring for the skipping duration on all serving cell of the cell group.

5. The method of claim 1, further comprising:
in case that a discontinuous reception (DRX) retransmission timer is running during the skipping duration, monitoring a PDCCH on the first serving cell during the skipping duration.

6. The method of claim 1, wherein the DCI further includes a field indicating a carrier for the second serving cell.

7. A method performed by a base station in a wireless communication system, the method comprising:
identifying that a plurality of cells are configured for a user equipment (UE);
transmitting, to the UE, information on a skipping duration;
transmitting, to the UE on a first serving cell among the plurality of cells, downlink control information (DCI) scheduling a physical downlink shared channel (PDSCH) or a physical uplink shared channel (PUSCH) for a second serving cell among the plurality of cells, the DCL including information that indicates skipping physical downlink control channel (PDCCH) monitoring; and
skipping a transmission of a PDCCH for the skipping duration on the first serving cell based on the DCI scheduling the PDSCH or the PUSCH for the second serving cell,
wherein the PDCCH whose transmission is skipped excludes a PDCCH for DCI addressed to a system information (SI)-radio network temporary identifier (RNTI) and a paging RNTI (P-RNTI).

8. The method of claim 7,
wherein the PDCCH whose transmission is skipped is associated with one of a cell RNTI (C-RNTI), a cancellation indication RNTI (CI-RNTI), a configured scheduling RNTI (CS-RNTI), an interruption RNTI (INT-RNTI), a slot format indication RNTI (SFI-RNTI), a semi-persistent channel state information RNTI (SP-CSI-RNTI), a transmit power control-physical uplink control channel RNTI (TPC-PUCCH-RNTI), a transmit power control-physical uplink shared channel RNTI (TPC-PUSCH-RNTI), a transmit power control-sounding reference signal RNTI (TPC-SRS-RNTI), or an availability indication RNTI (AI-RNTI).

9. The method of claim 7, further comprising:
receiving, from the UE, a message indicating whether the UE supports skipping of the PDCCH monitoring.

10. A user equipment (UE) in a wireless communication system, the UE comprising:
a transceiver configured to transmit and receive a signal; and
a controller coupled with the transceiver and configured to:
receive information on a skipping duration,
identify that a plurality of cells are configured,
receive, on a first serving cell among the plurality of cells, downlink control information (DCI) scheduling a physical downlink shared channel (PDSCH) or a physical uplink shared channel (PUSCH) for a second serving cell among the plurality of cells, the DCI including information that indicates skipping of physical downlink control channel (PDCCH) monitoring, and
skip monitoring of a PDCCH on the first serving cell for the skipping duration based on the DCI scheduling the PDSCH or the PUSCH for the second serving cell,
wherein the PDCCH for which monitoring is skipped excludes a PDCCH for DCI addressed to a system information (SI)-radio network temporary identifier (RNTI) and a paging RNTI (P-RNTI).

11. The UE of claim 10,
wherein the controller is configured to skip monitoring of a PDCCH associated with one of a cell RNTI (C-RNTI), a cancellation indication RNTI (CI-RNTI), a configured scheduling RNTI (CS-RNTI), an interruption RNTI (INT-RNTI), a slot format indication RNTI (SFI-RNTI), a semi-persistent channel state information RNTI (SP-CSI-RNTI), a transmit power control-physical uplink control channel RNTI (TPC-PUCCH-RNTI), a transmit power control-physical uplink shared channel RNTI (TPC-PUSCH-RNTI), a transmit power control-sounding reference signal RNTI (TPC-SRS-RNTI), or an availability indication RNTI (AI-RNTI).

12. The UE of claim 10,
wherein the controller is further configured to transmit a message indicating whether the UE supports skipping of the PDCCH monitoring.

13. A base station in a wireless communication system, the base station comprising:
a transceiver configured to transmit and receive a signal; and
a controller coupled with the transceiver and configured to:
identify that a plurality of cells are configured for a user equipment (UE),
transmit, to the UE, information on a skipping duration,
transmit, to the UE on a first serving cell among the plurality of cells, downlink control information (DCI) scheduling a physical downlink shared channel (PDSCH) or a physical uplink shared channel (PUSCH) for a second serving cell among the plurality of cells, the DCI including information that indicates skipping physical downlink control channel (PDCCH) monitoring, and
skip a transmission of a PDCCH for the skipping duration on the first serving cell based on the DCI scheduling the PDSCH or the PUSCH for the second serving cell,
wherein the PDCCH whose transmission is skipped excludes a PDCCH for DCI addressed to a system information (SI)-radio network temporary identifier (RNTI) and a paging RNTI (P-RNTI).

14. The base station of claim 13,
wherein the controller is further configured to receive, from the UE, a message indicating whether the UE supports skipping of the PDCCH monitoring, and
wherein the PDCCH whose transmission is skipped is associated with one of a cell RNTI (C-RNTI), a cancellation indication RNTI (CI-RNTI), a configured scheduling RNTI (CS-RNTI), an interruption RNTI (INT-RNTI), a slot format indication RNTI (SFI-RNTI), a semi-persistent channel state information RNTI (SP-CSI-RNTI), a transmit power control-physical uplink control channel RNTI (TPC-PUCCH-RNTI), a transmit power control-physical uplink shared channel RNTI (TPC-PUSCH-RNTI), a transmit power control-sounding reference signal RNTI (TPC-SRS-RNTI), or an availability indication RNTI (AI-RNTI).

* * * * *